(12) United States Patent
Pyun et al.

(10) Patent No.: US 12,536,932 B2
(45) Date of Patent: Jan. 27, 2026

(54) DISPLAY DEVICE

(71) Applicant: Samsung Display Co., Ltd., Yongin-si (KR)

(72) Inventors: Kihyun Pyun, Gwangmyeong-si (KR); Myoungseop Song, Cheonan-si (KR); Eunjin Choi, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 435 days.

(21) Appl. No.: 17/961,134

(22) Filed: Oct. 6, 2022

(65) Prior Publication Data

US 2023/0298493 A1 Sep. 21, 2023

(30) Foreign Application Priority Data

Mar. 16, 2022 (KR) ........................ 10-2022-0032732

(51) Int. Cl.
*G09G 3/00* (2006.01)
*G01R 19/32* (2006.01)
(Continued)

(52) U.S. Cl.
CPC ............ *G09G 3/006* (2013.01); *G01R 19/32* (2013.01); *G01R 31/2825* (2013.01);
(Continued)

(58) Field of Classification Search
CPC .. G09G 3/006; G09G 3/22; G09G 2300/0426; G09G 2320/029;
(Continued)

(56) References Cited

U.S. PATENT DOCUMENTS

2014/0312872 A1* 10/2014 Sato ........................ G05F 1/565
323/303
2014/0333603 A1* 11/2014 Choi .................... G09G 3/3233
345/82
(Continued)

FOREIGN PATENT DOCUMENTS

| KR | 100564577 B1 | 3/2006 |
|---|---|---|
| KR | 100864499 B1 | 10/2008 |
| KR | 101318448 B1 | 10/2013 |
| KR | 101351415 B1 | 1/2014 |
| KR | 101573698 B1 | 12/2015 |

*Primary Examiner* — William Boddie
*Assistant Examiner* — Saifeldin E Elnafia
(74) *Attorney, Agent, or Firm* — CANTOR COLBURN LLP

(57) ABSTRACT

A display device includes: a display panel including pixels, a power voltage generator for applying a power current to the display panel in a driving period; and a current sensor including a sensing resistor disposed between the display panel and the power voltage generator; a sensing current determiner for determining a sensing current; and a constant current generator for generating a constant current to the sensing resistor in a test period. The sensing current determiner determines a test sensing current based on a test sensing voltage applied to opposite electrodes of the sensing resistor in the test period and an initial sensing resistance, determines a first sensing resistance based on the test sensing current, the initial sensing resistance, and the constant current, and determines the sensing current based on a driving sensing voltage applied to the electrodes of the sensing resistor in the driving period and the first sensing resistance.

19 Claims, 16 Drawing Sheets

(51) Int. Cl.
  *G01R 31/28* (2006.01)
  *G01R 19/165* (2006.01)
  *G01R 27/02* (2006.01)
  *G09G 3/22* (2006.01)

(52) U.S. Cl.
  CPC ............ *G01R 19/165* (2013.01); *G01R 27/02* (2013.01); *G09G 3/22* (2013.01); *G09G 2300/0426* (2013.01); *G09G 2320/029* (2013.01); *G09G 2320/041* (2013.01); *G09G 2330/00* (2013.01); *G09G 2330/02* (2013.01); *G09G 2330/021* (2013.01); *G09G 2330/12* (2013.01)

(58) Field of Classification Search
  CPC ......... G09G 2320/041; G09G 2330/00; G09G 2330/02; G09G 2330/021; G09G 2330/12; G01R 19/165; G01R 19/32; G01R 27/02; G01R 31/2825
  See application file for complete search history.

(56) References Cited

U.S. PATENT DOCUMENTS

| | | | |
|---|---|---|---|
| 2017/0285840 A1* | 10/2017 | Ding | G06F 3/04166 |
| 2019/0147783 A1* | 5/2019 | Nam | G09G 3/3266 345/55 |
| 2019/0164484 A1* | 5/2019 | Yeo | G09G 3/3291 |
| 2021/0201815 A1* | 7/2021 | Bong | G09G 3/3266 |
| 2022/0057469 A1* | 2/2022 | Fortuny | G01R 1/30 |

* cited by examiner

DISPLAY DEVICE

This application claims priority to Korean Patent Application No. 10-2022-0032732, filed on Mar. 16, 2022, and all the benefits accruing therefrom under 35 U.S.C. § 119, the content of which in its entirety is herein incorporated by reference.

BACKGROUND

1. Field

Embodiments of the present invention relate to a display device. More particularly, embodiments of the present invention relate to a display device sensing a power current.

2. Description of the Related Art

Generally, a display device may include a display panel, a driving controller, gate driver, and a data driver. The display panel may include a plurality of gate lines, a plurality of data lines, and a plurality of pixels electrically connected to the gate lines and the data lines. The gate driver may provide gate signals to the gate lines. The data driver may provide data voltages to the data lines. The driving controller may control the gate driver and the data driver.

In a conventional display device, a sensing resistor may be disposed in a path to which a power current is applied to sense the power current applied to a display panel, and a voltage applied to opposite electrodes of the sensing resistor is measured.

SUMMARY

However, there is a problem in that a resistance of the sensing resistor is affected by a parasitic resistance generated by the printed circuit board.

Embodiments of the present invention provide a display device that improves an accuracy of sensing of a power current by compensating for a resistance dispersion generated by a printed circuit board.

Embodiments of the present invention also provide a display device that improves an accuracy of sensing of a power current by compensating for an increase of a resistance according to a temperature of a printed circuit board.

According to embodiments of the present invention, a display device includes: a display panel including pixels, a power voltage generator configured to apply a power current to the display panel in a driving period, and a current sensor including a sensing resistor disposed between the display panel and the power voltage generator, a sensing current determiner configured to determine a sensing current, and a constant current generator configured to generate a constant current to provide to the sensing resistor in a test period. The sensing current determiner is configured to determine a test sensing current based on a test sensing voltage applied to opposite electrodes of the sensing resistor in the test period and an initial sensing resistance, to determine a first sensing resistance based on the test sensing current, the initial sensing resistance, and the constant current, and to determine the sensing current based on a driving sensing voltage applied to the opposite electrodes of the sensing resistor in the driving period and the first sensing resistance.

In an embodiment, the test sensing current may be determined by dividing the test sensing voltage by the initial sensing resistance, the first sensing resistance may be determined by dividing the test sensing voltage by the constant current, and the sensing current may be determined by dividing the driving sensing voltage by the first sensing resistance.

In an embodiment, the sensing current determiner may include a sensing resistance determiner configured to determine the first sensing resistance based on a first current code corresponding to the test sensing current, a second current code corresponding to the constant current, and the initial sensing resistance, an initial sensing resistance storager configured to store the initial sensing resistance, and an analog-digital converter configured to determine the test sensing current in the test period, to generate the first current code by analog-digital conversion of the test sensing current, to determine the sensing current in the driving period, and to generate a third current code by analog-digital conversion of the sensing current.

In an embodiment, the current sensor may further include a filter configured to block a current flowing to the sensing current determiner.

In an embodiment, the current sensor may further include a test switching element disposed between the display panel and the sensing resistor, and configured to be switched off in the test period and to be switched on in the driving period.

In an embodiment, the constant current generator may include a constant current controller configured to apply a reference voltage control signal to a reference voltage generator in the test period, a reference voltage generator configured to generate a reference voltage in response to the reference voltage control signal, and a constant current generation circuit configured to receive the reference voltage to generate the constant current.

In an embodiment, the constant current generation circuit may include a comparator including a first input electrode configured to receive the reference voltage, a second input electrode connected to a first node, and an output electrode connected to a control electrode of a constant current transistor, the constant current transistor including the control electrode connected to the output electrode of the comparator, a first electrode connected to a first electrode of the sensing resistor, and a second electrode connected to a first electrode of a constant current switching element, the constant current switching element including the first electrode connected to the second electrode of the constant current transistor and a second electrode connected to the first node, and a constant current resistor including a first electrode connected to the first node and a second electrode grounded.

In an embodiment, the current sensor may be disposed on a printed circuit board. The sensing current determiner may be configured to sense a temperature of the printed circuit board, to determine a second sensing resistance based on the temperature of the printed circuit board and the first sensing resistance, and to determine the sensing current based on the driving sensing voltage and the second sensing resistance.

In an embodiment, the sensing current determiner may include: a temperature measurer configured to sense the temperature of the printed circuit board; a sensing resistance determiner, including a temperature-compensation lookup table in which a compensation value according to the temperature of the printed circuit board is stored, and configured to determine the first sensing resistance based on a first current code corresponding to the test sensing current, a second current code corresponding to the constant current, and the initial sensing resistance, configured to determine the compensation value based on the temperature of the printed circuit board and the temperature-compensation lookup table, and configured to determine the second sensing resistance by adding the compensation value to the first sensing resistance; an initial sensing resistance storager configured to store the initial sensing resistance; and an analog-digital converter configured to determine the test sensing current in the test period, to generate the first current code by analog-digital conversion of the test sensing current, to determine the sensing current in the driving period, and to generate a third current code by analog-digital conversion of the sensing current.

In an embodiment, the compensation value may increase as the temperature of the printed circuit board increases.

According to embodiments of the present invention, a display device includes a display panel including pixels, a power voltage generator configured to apply a power current to the display panel in a driving period, and a current sensor including a sensing resistor disposed between the display panel and the power voltage generator, a sensing current determiner configured to determine a sensing current, and a constant current generator configured to generate constant currents to provide to the sensing resistor in a test period. The sensing current determiner is configured to determine test sensing currents based on a test sensing voltage applied to opposite electrodes of the sensing resistor according to the constant currents in the test period and an initial sensing resistance, to determine candidate sensing resistances based on the test sensing currents, the initial sensing resistance, and the constant currents, to determine a first sensing resistance based on the candidate sensing resistances, and to determine the sensing current based on a driving sensing voltage applied to the opposite electrodes of the sensing resistor in the driving period and the first sensing resistance.

In an embodiment, the constant current generator may be configured to generate a first constant current and a second constant current different from the first constant current, the sensing current determiner may be configured to determine a first test sensing current by dividing a first test sensing voltage applied to the opposite electrodes of the sensing resistor according to the first constant current by the initial sensing resistance, the sensing current determiner may be configured to determine a second test sensing current by dividing a second test sensing voltage applied to the opposite electrodes of the sensing resistor according to the second constant current by the initial sensing resistance, the sensing current determiner may be configured to determine a first candidate sensing resistance by dividing the first test sensing voltage by the first constant current, the sensing current determiner may be configured to determine a second candidate sensing resistance by dividing the second test sensing voltage by the second constant current, and the sensing current determiner may be configured to determine the sensing current based on the first candidate sensing resistance and the second candidate sensing resistance.

In an embodiment, the constant current generator may include a constant current controller configured to apply reference voltage control signals to a reference voltage generator in the test period, a reference voltage generator configured to generate a first reference voltage and a second reference voltage in response to the reference voltage control signals, and a constant current generation circuit configured to receive the first reference voltage to generate the first constant current, and to receive the second reference voltage to generate the second constant current.

In an embodiment, the sensing current determiner may be configured to determine a maximum value among the candidate sensing resistances as the first sensing resistance.

In an embodiment, the sensing current determiner may be configured to determine a minimum value among the candidate sensing resistances as the first sensing resistance.

In an embodiment, the sensing current determiner may be configured to determine an average value of the candidate sensing resistances as the first sensing resistance.

According to embodiments of the present invention, a display device includes: a display panel including pixels, a power voltage generator configured to apply a power current to the display panel, and a current sensor disposed on a printed circuit board, and including a sensing resistor disposed between the display panel and the power voltage generator and a sensing current determiner configured to determine a sensing current. The sensing current determiner is configured to sense a temperature of the printed circuit board, to determine a first sensing resistance based on the temperature of the printed circuit board and an initial sensing resistance, and to determine the sensing current based on a driving sensing voltage applied to the opposite electrodes of the sensing resistor and the first sensing resistance.

In an embodiment, the sensing current may be determined by dividing the driving sensing voltage by the first sensing resistance.

In an embodiment, the sensing current determiner may include a temperature measurer configured to sense the temperature of the printed circuit board, a sensing resistance determiner including a temperature-compensation lookup table in which a compensation value according to the temperature of the printed circuit board is stored, and configured to determine the compensation value based on the temperature of the printed circuit board and the temperature-compensation lookup table, and configured to determine the first sensing resistance by adding the compensation value to the initial sensing resistance, an initial sensing resistance storager configured to store the initial sensing resistance, and an analog-digital converter configured to determine the sensing current, and to convert the sensing current to analog-to-digital.

In an embodiment, the compensation value may increase as the temperature of the printed circuit board increases.

Therefore, the display device may compensate for a resistance dispersion generated by a printed circuit board to improve an accuracy of sensing of a power current by determining a test sensing current based on a test sensing voltage applied to opposite electrodes of the sensing resistor in the test period and an initial sensing resistance, determining a first sensing resistance based on the test sensing current, the initial sensing resistance, and the constant current, and determining the sensing current based on a driving sensing voltage applied to the opposite electrodes of the sensing resistor in the driving period and the first sensing resistance.

In addition, the display device may further improve an accuracy of sensing of a power current by determining test sensing currents based on a test sensing voltage applied to opposite electrodes of the sensing resistor according to the constant currents in the test period and an initial sensing resistance, determining candidate sensing resistances based on the test sensing currents, the initial sensing resistance, and the constant currents, determining a first sensing resistance based on the candidate sensing resistances, and determining the sensing current based on a driving sensing voltage applied to the opposite electrodes of the sensing resistor in the driving period and the first sensing resistance.

Further, the display device may compensate for a resistance increase according to a temperature of a printed circuit board to improve an accuracy of sensing of a power current by sensing a temperature of the printed circuit board, determining a first sensing resistance based on the temperature of the printed circuit board and an initial sensing resistance, and determining the sensing current based on a driving sensing voltage applied to the opposite electrodes of the sensing resistor and the first sensing resistance.

However, the effects of the present invention are not limited to the above-described effects, and may be variously expanded without departing from the spirit and scope of the present invention.

DETAILED DESCRIPTION

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Hereinafter, the present invention will be explained in detail with reference to the accompanying drawings.

Figure 1:
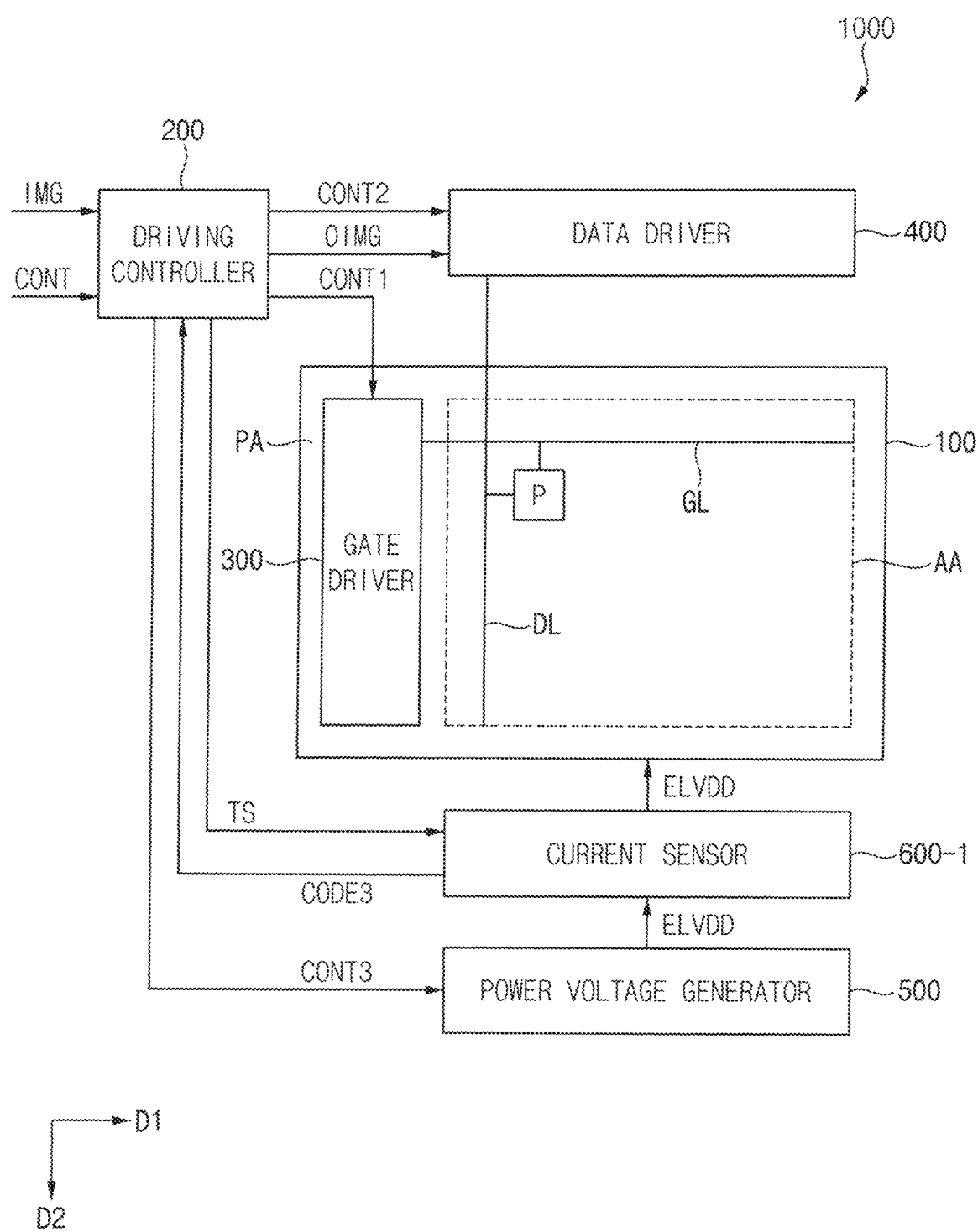
FIG. 1 is a block diagram illustrating a display device according to embodiments of the present invention.

FIG. 1 is a block diagram illustrating a display device 1000 according to embodiments of the present invention.

Referring to FIG. 1, the display device 1000 may include a display panel 100, a driving controller 200, a gate driver 300, a data driver 400, a power voltage generator 500, and a current sensor 600-1. In an embodiment, the driving controller 200 and the data driver 400 may be integrated into one chip.

The display panel 100 has a display region AA on which an image is displayed and a peripheral region PA adjacent to the display region AA. In an embodiment, the gate driver 300 may be mounted on the peripheral region PA of the display panel 100.

The display panel 100 may include a plurality of gate lines GL, a plurality of data lines DL, and a plurality of pixels P electrically connected to the data lines DL and the gate lines GL. The gate lines GL may extend in a first direction D1 and the data lines DL may extend in a second direction D2 crossing the first direction D1.

The driving controller 200 may receive input image data IMG and an input control signal CONT from a host processor (e.g., a graphic processing unit; GPU). For example, the input image data IMG may include red image data, green image data and blue image data. In an embodiment, the input image data IMG may further include white image data. For another example, the input image data IMG may include magenta image data, yellow image data, and cyan image data. The input control signal CONT may include a master clock signal and a data enable signal. The input control signal CONT may further include a vertical synchronizing signal and a horizontal synchronizing signal.

The driving controller 200 may generate a first control signal CONT1, a second control signal CONT2, a test start signal TS, a third control signal CONT3, and output image data OIMG based on the input image data IMG, a third current code CODE3, and the input control signal CONT.

The driving controller 200 may generate the first control signal CONT1 for controlling operation of the gate driver 300 based on the input control signal CONT and output the first control signal CONT1 to the gate driver 300. The first control signal CONT1 may include a vertical start signal and a gate clock signal.

The driving controller 200 may generate the second control signal CONT2 for controlling operation of the data driver 400 based on the input control signal CONT and output the second control signal CONT2 to the data driver 400. The second control signal CONT2 may include a horizontal start signal and a load signal.

The driving controller 200 may generate the third control signal CONT3 for controlling operation of the power voltage generator 500 based on the input control signal CONT and output the third control signal CONT3 to the power voltage generator 500.

The driving controller 200 may receive the input image data IMG and the input control signal CONT, and generate the output image data OIMG. In an embodiment, the driving controller 200 may receive the input image data IMG, the third current code CODE3, and the input control signal CONT, and generate the output image data OIMG. The driving controller 200 may output the output image data OIMG to the data driver 400.

The gate driver 300 may generate gate signals for driving the gate lines GL in response to the first control signal CONT1 input from the driving controller 200. The gate driver 300 may output the gate signals to the gate lines GL. For example, the gate driver 300 may sequentially output the gate signals to the gate lines GL.

The data driver 400 may receive the second control signal CONT2 and the output image data OIMG from the driving controller 200. The data driver 400 may convert the output image data OIMG into data voltages having an analog type. The data driver 400 may output the data voltage to the data lines DL.

The power voltage generator 500 may generate voltages for driving the display device 1000 in response to the third control signal CONT3 received from the driving controller 200. For example, the power voltage generator 500 may generate a power voltage ELVDD applied to the display panel 100.

The current sensor 600-1 may sense a current flowing therethrough as the power voltage generator 500 applies the power voltage ELVDD to the display panel 100. A detailed description thereof will be given later.

Figure 2:
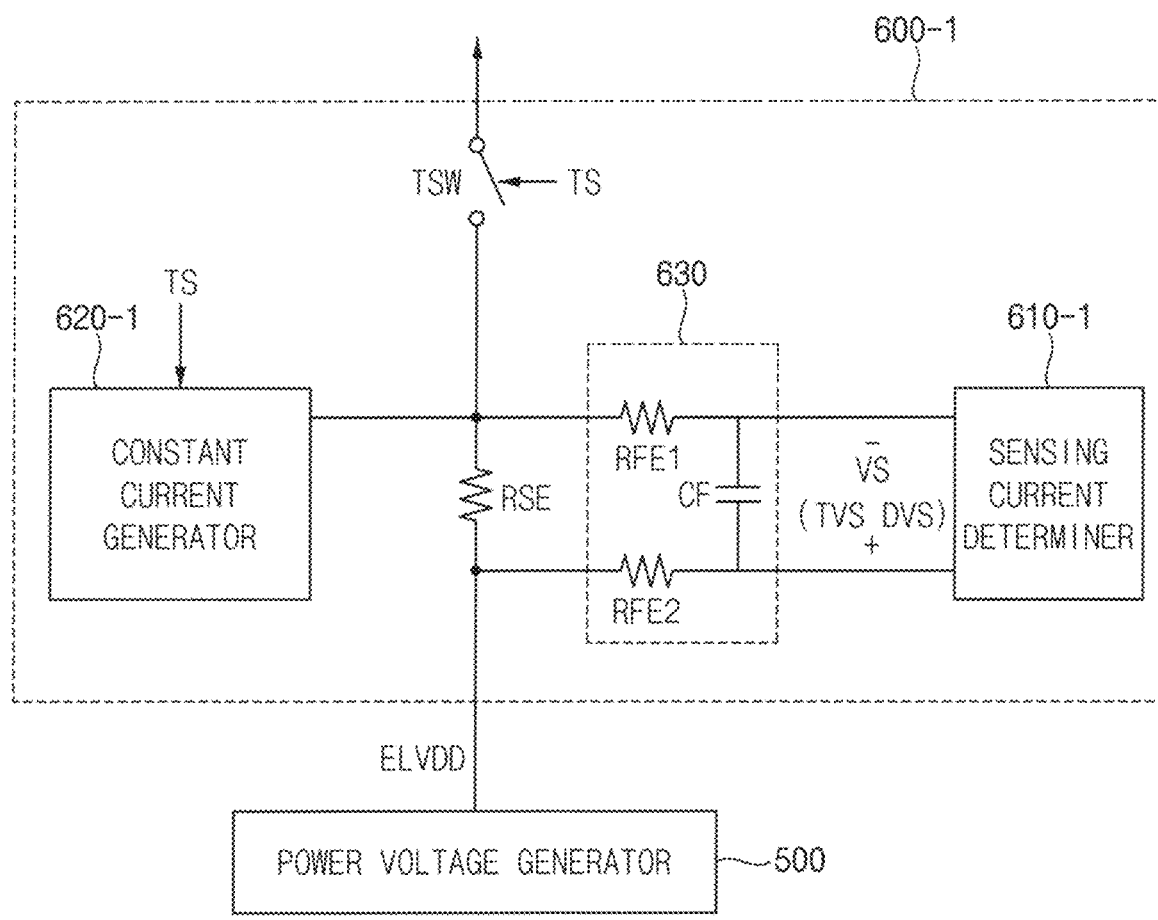
FIG. 2 is a diagram illustrating an example of a current sensor of the display device of FIG. 1.
Figure 3:
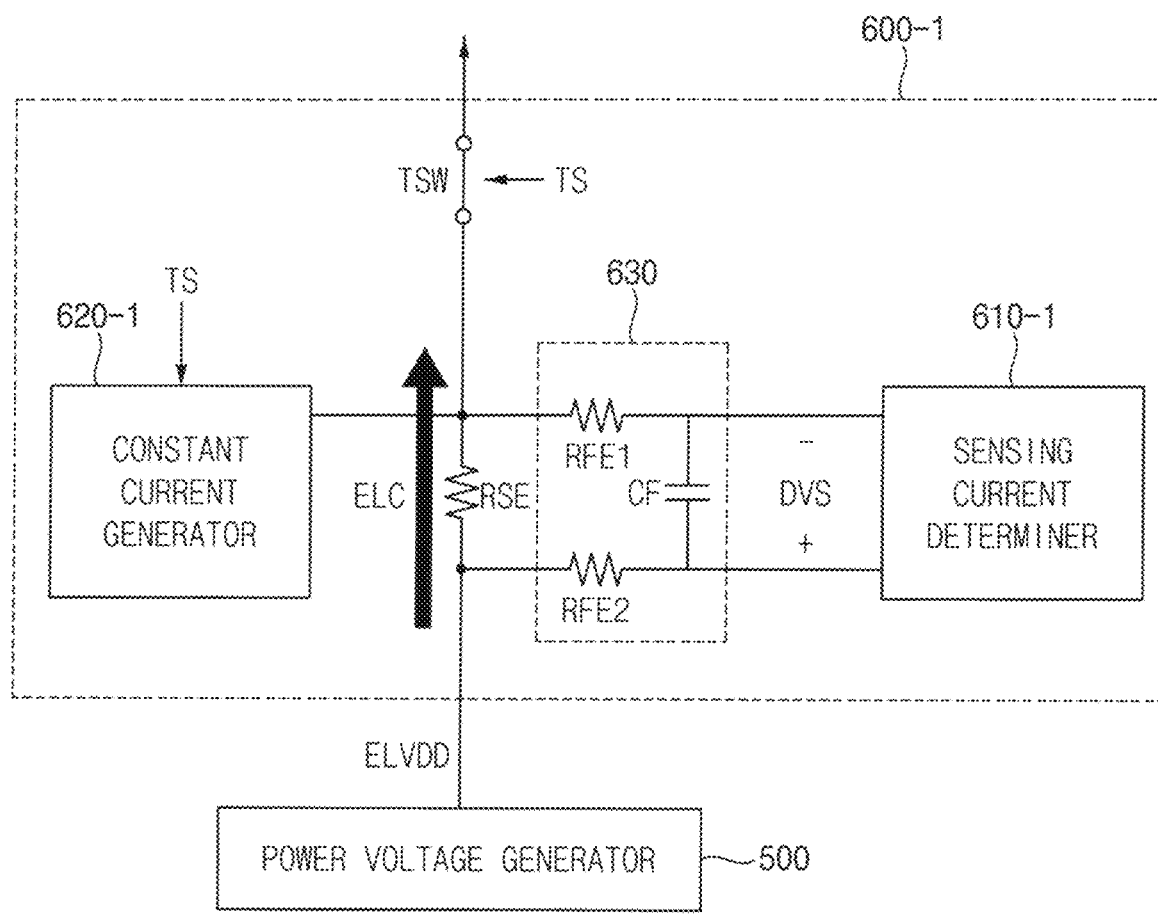
FIG. 3 is a diagram illustrating an example in which the display device of FIG. 1 operates in a driving period.
Figure 4:
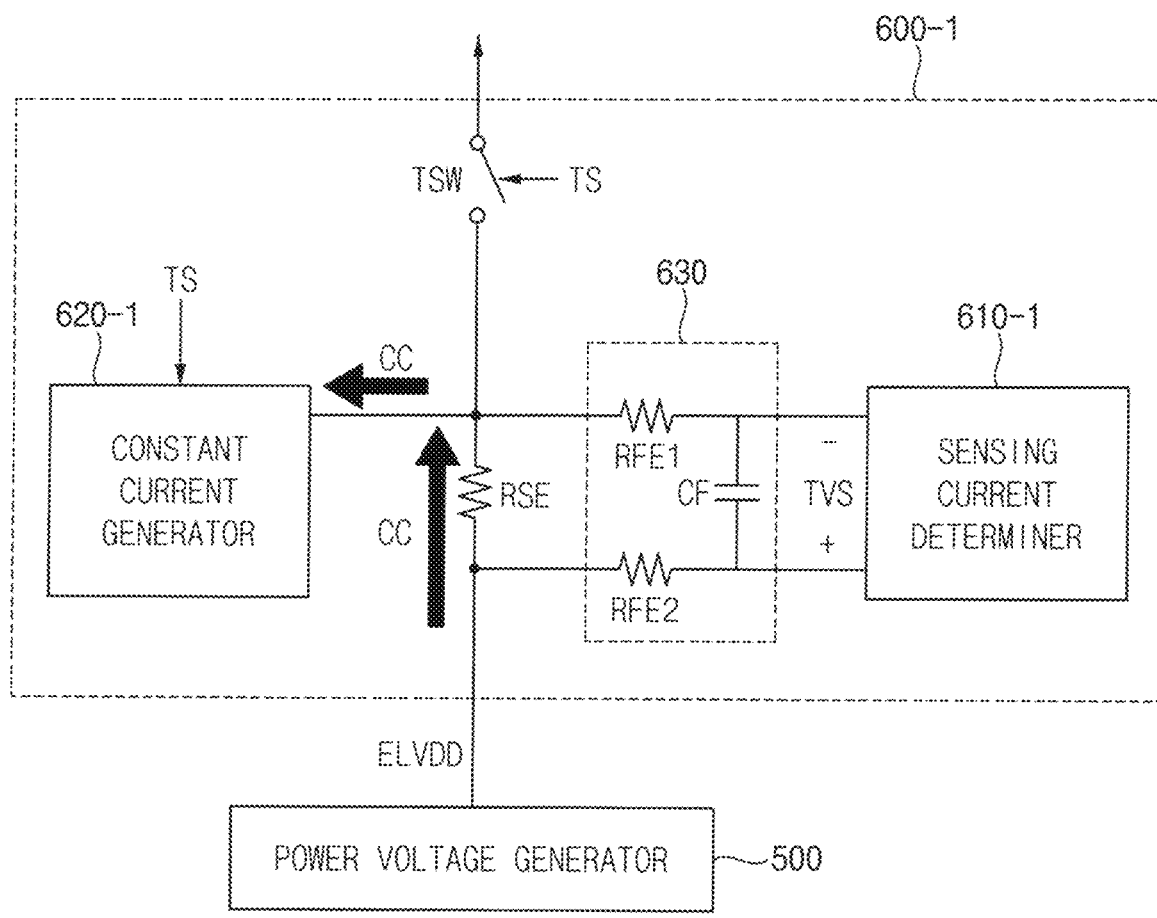
FIG. 4 is a diagram illustrating an example in which the display device of FIG. 1 operates in a test period.
Figure 5:
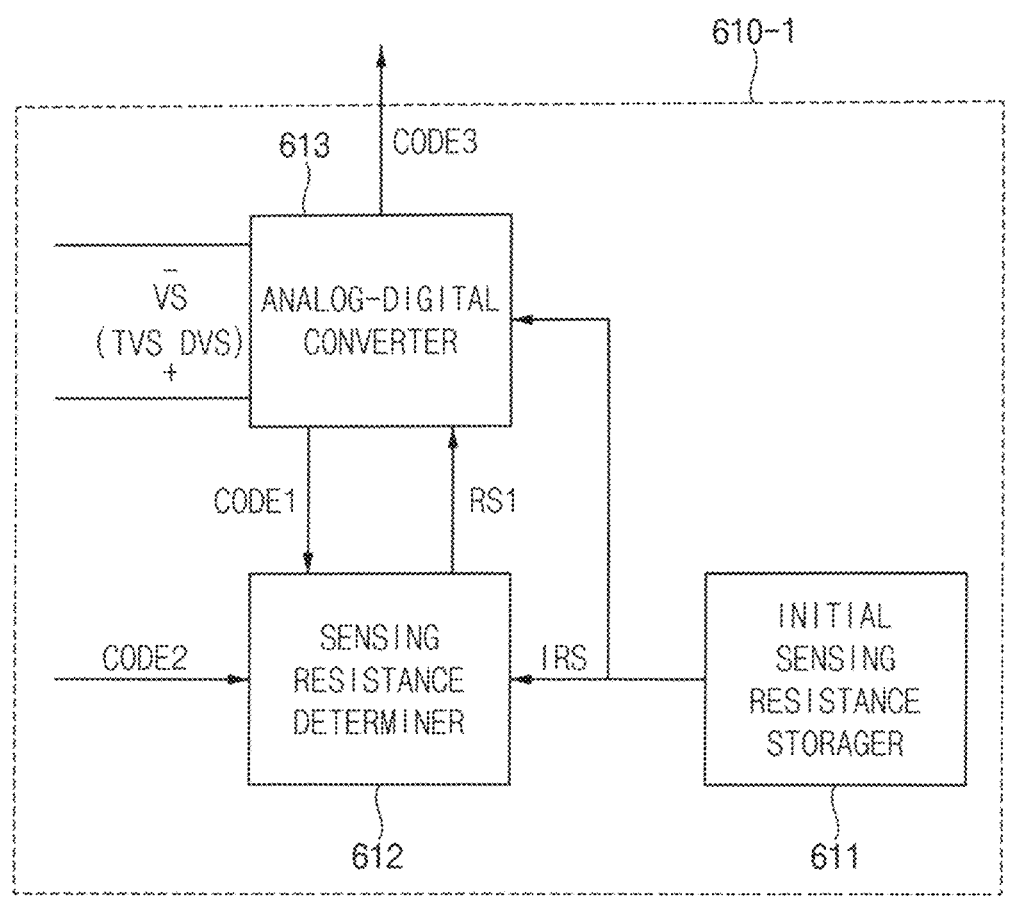
FIG. 5 is a block diagram illustrating an example of a sensing current determiner of the display device of FIG. 1.
Figure 6:
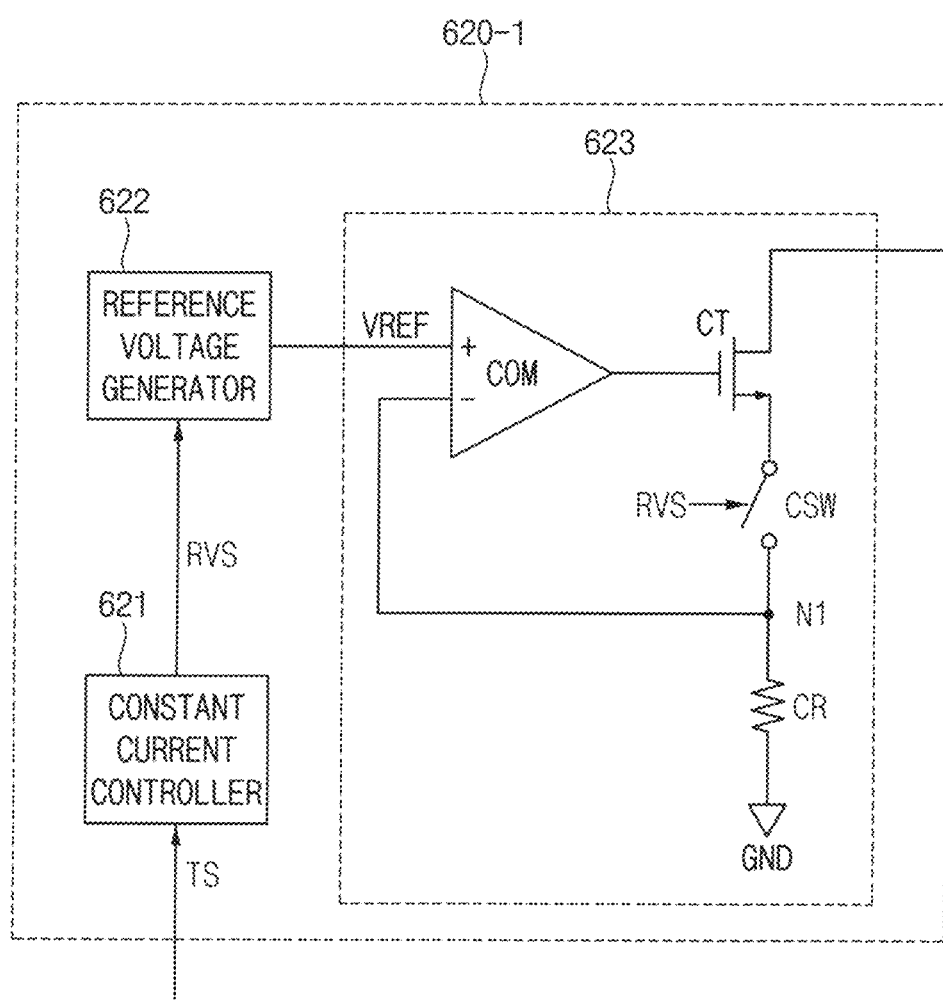
FIG. 6 is a diagram illustrating an example of a constant current generator of the display device of FIG. 1.

FIG. 2 is a diagram illustrating an example of the current sensor 600-1 of the display device 1000 of FIG. 1, FIG. 3 is a diagram illustrating an example in which the display device 1000 of FIG. 1 operates in a driving period, FIG. 4 is a diagram illustrating an example in which the display device 1000 of FIG. 1 operates in a test period, FIG. 5 is a block diagram illustrating an example of a sensing current determiner 610-1 of the display device 1000 of FIG. 1, and FIG. 6 is a diagram illustrating an example of a constant current generator 620-1 of the display device 1000 of FIG. 1.

Referring to FIGS. 2 to 6, the power voltage generator 500 may apply a power current ELC to the display panel 100 (i.e., as the power voltage ELVDD is applied, the power current ELC may be applied to the display panel 100). The current sensor 600-1 may include a sensing resistor RSE disposed between the display panel 100 and the power voltage generator 500, the sensing current determiner 610-1 for determining a sensing current, and a constant current generator 620-1 for generating a constant current CC and providing the constant current CC to the sensing resistor RSE in the test period. In an embodiment, the current sensor 600-1 may be disposed on a printed circuit board ("PCB"). In an embodiment, the sensing current determiner 610-1 and the constant current generator 620-1 may be integrated into one IC chip.

In an embodiment, the current sensor 600-1 may further include a filter 630 for blocking a current flowing to the sensing current determiner 610-1. Accordingly, the power current ELC and the constant current CC may not flow to the sensing current determiner 610-1. As a result, the sensing voltage VS applied to opposite electrodes of the sensing resistor RSE may be directly applied to the sensing current determiner 610-1. Accordingly, to sense the power current ELC, the display device 1000 may not directly measure the power current ELC but determine the sensing current from the sensing voltage VS by the sensing current determiner 610-1. That is, the display device 1000 may assume the determined sensing current as the power current ELC, and perform various operations based on the determined sensing current. Here, the "sensing current" is a current determined by the sensing current determiner 610-1 as the power current flowing the sensing resistor RSE in the driving period. For example, the display device 1000 may compensate for the input image data IMG based on the sensing current, and the display device 1000 may be shut down when the sensing current exceeds a predetermined value.

In an embodiment, for example, the filter 630 may include a first filter resistor RFE1 including a first electrode connected to a first electrode of the sensing resistor RSE and a second electrode connected to the sensing current determiner 610-1, a second filter resistor RFE2 including a first electrode connected to the second electrode of the sensing resistor RSE and a second electrode connected to the sensing current determiner 610-1, and the filter capacitor CF including a first electrode connected to the second electrode of the first filter resistor RFE1 and a second electrode connected to the second electrode of the second filter resistor RFE2. A resistance of the first filter resistor RFE1 and a resistance of the second filter resistor RFE2 may be the same.

In an embodiment, the current sensor 600-1 may further include a test switching element TSW disposed between the display panel 100 and the sensing resistor RSE, may be switched off in the test period, and may be switched on in the driving period. For example, the test switching element TSW may be switched off in response to the test start signal TS. The test period may be a period for compensating for a resistance dispersion (e.g., a resistance dispersion according to an amount of lead (Pb) in the printed circuit board on which the sensing resistor is disposed, a contact resistance dispersion between the printed circuit board and the sensing resistor, a trace resistance dispersion of the printed circuit board etc.) generated by the printed circuit board before driving the display device 1000. The driving period may be a period in which the display device 1000 operates to display an image.

In an embodiment, for example, in the driving period, the power voltage generator 500 may apply the power current ELC (corresponding to the power voltage ELVDD) to the display panel 100. As the power current ELC is applied, the driving sensing voltage DVS may be applied to the opposite electrodes of the sensing resistor RSE. The display panel 100 may be driven by the power current ELC (e.g., light emission of the pixels P).

In an embodiment, for example, in the test period, the power voltage generator 500 may not apply the power current ELC (corresponding to the power voltage ELVDD) to the display panel 100. Accordingly, the power voltage generator 500 may not flow the power current ELC. In the test period, the constant current generator 620-1 may generate the constant current CC to the sensing resistor RSE. The constant current generator 620-1 may generate the constant current CC, and the generated constant current CC may flow from the sensing resistor RSE to the constant current generator 620-1 (i.e., because the test switching element TSW is switched off, and the filter 630 blocks a current flowing to the sensing current determiner 610-1.).

Also, the test sensing voltage TVS may be applied to the opposite electrodes of the sensing resistor RSE. Accordingly, as a difference between the test sensing current determined in the test period and the constant current CC is smaller, an accuracy of sensing of the power current ELC (i.e., determining the sensing current) may be higher. Here, the "test sensing current" is a current determined by the sensing current determiner 610-1 as the constant current flowing the sensing resistor RSE in the test period. The display device 1000 may determine the first sensing resistance RS1 for reducing the difference between the test sensing current and the constant current CC in the test period. Hereinafter, it will be described in detail.

The sensing current determiner 610-1 may determine the test sensing current based on a test sensing voltage TVS applied to the opposite electrodes of the sensing resistor RSE in the test period and an initial sensing resistance IRS, determine a first sensing resistance RS1 based on the test sensing current, the initial sensing resistance IRS, and the constant current CC, and determine the sensing current based on a driving sensing voltage DVS applied to the opposite electrodes of the sensing resistor RSE in the driving period and the first sensing resistance RS1.

In an embodiment, the sensing current determiner may include an initial sensing resistance storager 611, a sensing resistance determiner 612, and an analog-digital converter 613. The initial sensing resistance storager 611 may store the initial sensing resistance IRS. The sensing resistance determiner 612 may determine the first sensing resistance RS1 based on a first current code CODE1 corresponding to the test sensing current, a second current code CODE2 corresponding to the constant current CC, and the initial sensing resistance IRS. The analog-digital converter 613 may determine the test sensing current in the test period, generate the first current code CODE1 by analog-digital conversion of the test sensing current, determine the sensing current in the driving period, and generate a third current code CODE3 by analog-digital conversion of the sensing current.

The initial sensing resistance storager 611 may store the initial sensing resistance IRS. In an embodiment, the initial sensing resistance IRS may be a predetermined resistance of the sensing resistor RSE. For example, all of the display devices using the same sensing resistor RSE may have the same initial sensing resistance IRS. Accordingly, when the sensing current is determined based on the initial sensing resistance IRS, an error rate of the sensing current may vary for each display device performing the sensing of the power current ELC due to the resistance dispersion generated by the printed circuit board. Here, the error rate of the sensing current is a ratio of a difference between an actual current flowing through the sensing resistor RSE and the sensing current determined to be the actual current by the sensing current determiner 610-1. Accordingly, each display device may be desirable to separately compensate for the resistance dispersion generated by the printed circuit board.

The sensing resistance determiner 612 may calculate the test sensing voltage TVS based on the first current code CODE1 and the initial sensing resistance IRS, and determine the first sensing resistance RS1 based on the test sensing voltage TVS and the constant current CC (i.e., the second current code CODE2). The analog-digital converter 613 may determine the test sensing current in the test period, generate the first current code CODE1 by analog-digital conversion of the test sensing current. The analog-digital converter 613 may determine the test sensing current using Ohm's law (V=IR). For example, the test sensing current may be determined by dividing the test sensing voltage TVS by the initial sensing resistance IRS, and the first sensing resistance RS1 may be determined by dividing the test sensing voltage TVS by the constant current CC.

In an embodiment, for example, the constant current generator 620-1 may generate the constant current CC to be provided to the sensing resistor RSE. The analog-digital converter 613 may determine the test sensing current by dividing the test sensing voltage TVS by the initial sensing resistance IRS, and generate the first current code CODE1 by analog-digital conversion of the test sensing current. The sensing resistance determiner 612 may calculate the test sensing voltage TVS based on the first current code CODE1 and the initial sensing resistance IRS. The sensing resistance determiner 612 may calculate the constant current CC from the second current code CODE2 generated by analog-digital conversion of the constant current CC. The sensing resistance determiner 612 may determine the first sensing resistance RS1 by dividing the test sensing voltage TVS by the constant current CC. That is, when the display device 1000 determines the test sensing current based on the first sensing resistance RS1 instead of the initial sensing resistance IRS, the test sensing current and the constant current CC may be equal to each other. Accordingly, the display device 1000 may compensate for the resistance dispersion generated by the printed circuit board to improve the accuracy of the sensing of the power current ELC by determining the sensing current based on the first sensing resistance RS1.

The analog-digital converter 613 may determine the sensing current based on the driving sensing voltage DVS and the first sensing resistance RS1. The analog-digital converter 613 may generate a third current code CODE3 by analog-digital conversion of the sensing current. The analog-digital converter 613 may apply the third current code CODE3 to the driving controller 200. The analog-digital converter 613 may determine the sensing current by using Ohm's law (V=IR). For example, the sensing current may be determined by dividing the driving sensing voltage DVS by the first sensing resistance RS1.

The driving controller 200 may receive the third current code CODE3 to compensate for the input image data IMG. For example, the driving controller 200 may calculate the sensing current from the third current code CODE3, determine a degree of degradation of the pixels P based on the sensing current, and compensate for the input image data according to the degree of the degradation of the pixels P.

When the sensing current exceeds a predetermined value, the driving controller 200 may shut down the display device 1000 (i.e., stop the driving of the display device 1000). That is, the driving controller 200 may determine whether an overcurrent flows to the display panel 100 through the sensing current, and shut down the display device 1000 when the overcurrent flows to the display panel 100.

The constant current generator 620-1 may include a constant current controller 621 for applying a reference voltage control signal RVS to a reference voltage generator 622 in the test period, the reference voltage generator 622 for generating a reference voltage VREF in response to the reference voltage control signal RVS, and a constant current generation circuit 623 for receiving the reference voltage VREF to generate the constant current CC.

In an embodiment, for example, the constant current generation circuit 623 may include a comparator COM including a first input electrode for receiving the reference voltage VREF, a second input electrode connected to a first node N1, and an output electrode connected to a control electrode of a constant current transistor CT, the constant current transistor CT including the control electrode connected to the output electrode of the comparator COM, a first electrode connected to a first electrode of the sensing resistor RSE (i.e., an electrode connected to the display panel 100 among the opposite electrodes of the sensing resistor RSE), and a second electrode connected to a first electrode of a constant current switching element CSW, the constant current switching element CSW including the first electrode connected to the second electrode of the constant current transistor CT and a second electrode connected to the first node N1, and a constant current resistor CR including a first electrode connected to the first node N1 and a second electrode grounded (i.e., connected to ground GND).

In an embodiment, for example, in the test period, the constant current switching element CSW may be switched on in response to the reference voltage control signal RVS, a voltage of the first node N1 may be equal to the reference voltage VREF, and the constant current CC may be generated by the constant current resistor CR and the voltage of the first node N1 (i.e., the reference voltage VREF).

Figure 7:
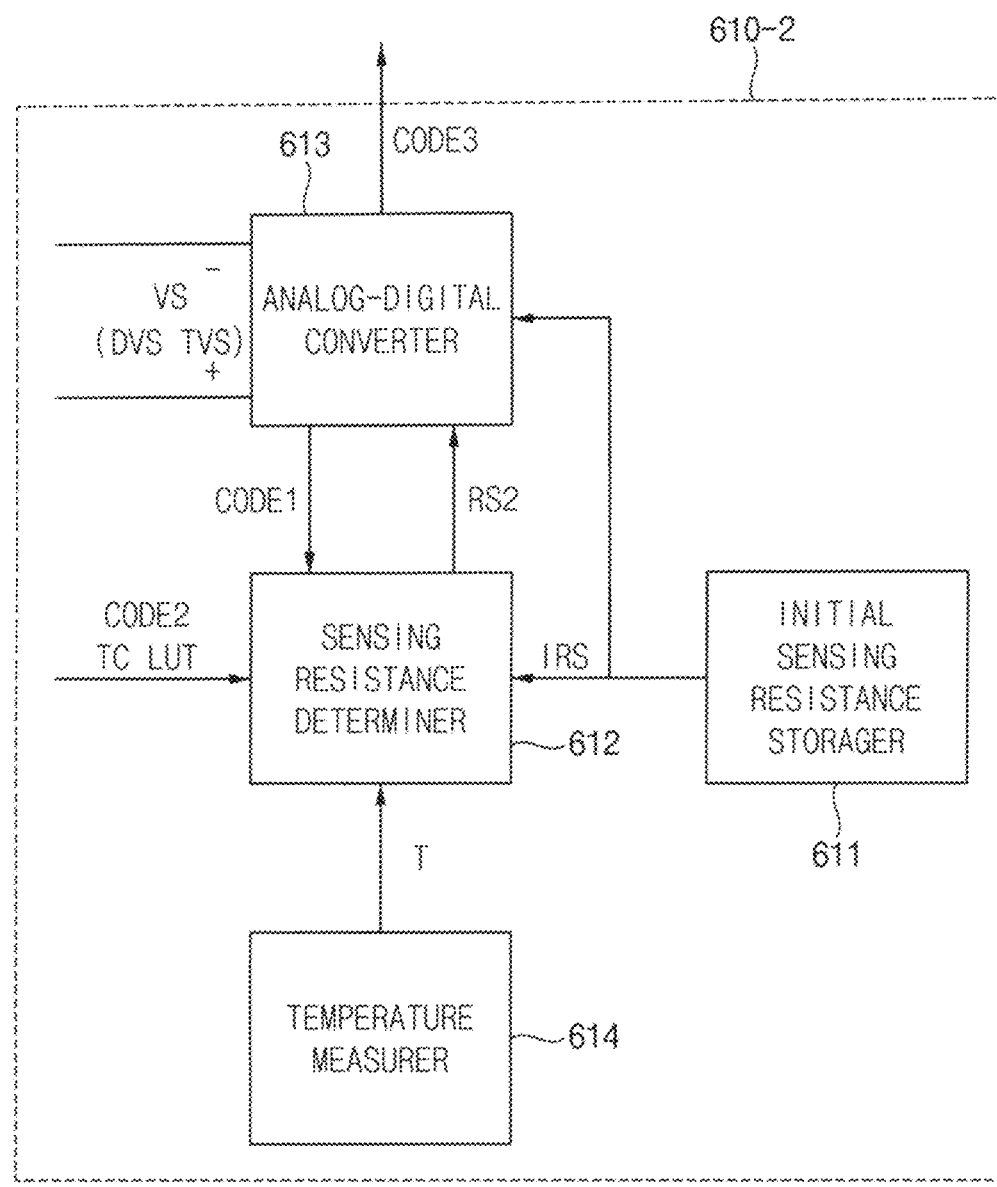
FIG. 7 is a block diagram illustrating an example of a sensing current determiner of a display device according to embodiments of the present invention.
Figure 8:
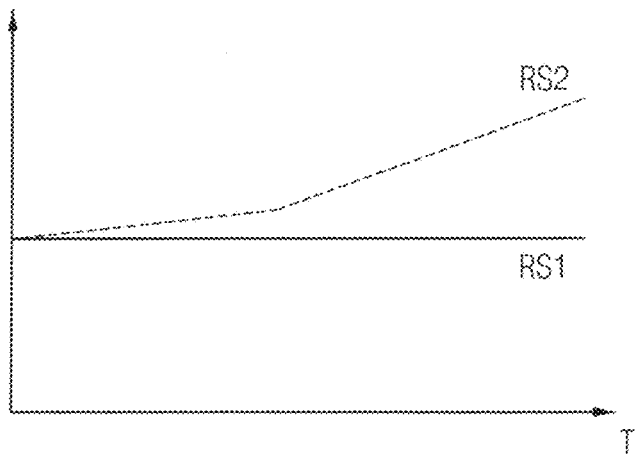
FIG. 8 is a graph illustrating an example of a first sensing resistance and a second sensing resistance of the display device of FIG. 7.

FIG. 7 is a block diagram illustrating an example of a sensing current determiner 610-2 of a display device according to embodiments of the present invention, and FIG. 8 is a graph illustrating an example of the first sensing resistance RS1 and a second sensing resistance RS2 of the display device of FIG. 7.

The display device according to the present embodiment is substantially the same as the display device 1000 of FIG. 1 except for the sensing current determiner 610-2. Thus, the same reference numerals are used to refer to the same or similar element, and any repetitive explanation will be omitted.

Referring to FIGS. 2 to 4, 7, and 8, the current sensor 600-1 may be disposed on the printed circuit board. The sensing current determiner 610-2 may sense a temperature T of the printed circuit board, determine the second sensing resistance RS2 based on the temperature T of the printed circuit board and the first sensing resistance RS1, and determine the sensing current based on the driving sensing voltage DVS and the second sensing resistance RS2.

The sensing current determiner 610-2 may include an initial sensing resistance storager 611, a sensing resistance determiner 612, an analog-digital converter 613, an analog-digital converter 613, and a temperature measurer 614. The temperature measurer 614 may sense the temperature T of the printed circuit board. The initial sensing resistance storager 611 may store the initial sensing resistance IRS. The sensing resistance determiner 612 may determine the first sensing resistance RS1 based on the first current code CODE1 corresponding to the test sensing current, the second current code CODE2 corresponding to the constant current CC, and the initial sensing resistance IRS, may include a temperature-compensation lookup table TC LUT in which a compensation value according to the temperature T of the printed circuit board is stored, may determine the compensation value based on the temperature T of the printed circuit board and the temperature-compensation lookup table TC LUT, and may determine the second sensing resistance RS2 by adding the compensation value to the first sensing resistance RS1. The analog-digital converter 613 may determine the test sensing current in the test period, may generate the first current code CODE1 by analog-digital conversion of the test sensing current, may determine the sensing current in the driving period, and may generate the third current code CODE3 by analog-digital conversion of the sensing current. A process of determining the first sensing resistance RS1 is substantially the same as a process of determining the first sensing resistance RS1 of the display device 1000 of FIG. 1. Thus, any repetitive explanation will be omitted.

The sensing resistance determiner 612 may determine the compensation value based on the temperature T of the printed circuit board and the temperature-compensation lookup table TC LUT, and may determine the second sensing resistance RS2 by adding the compensation value to the first sensing resistance RS1. The compensation value may increase as the temperature T of the printed circuit board increases.

A resistance including a parasitic resistance of the sensing resistor RSE may increase as temperature increases. Since the sensing resistor RSE is disposed on the printed circuit board, the resistance of the sensing resistor RSE may increase as the temperature T of the printed circuit board increases. The temperature-compensation lookup table TC LUT may store a degree of resistance increase according to temperature as the compensation value according to the temperature T of the printed circuit board. Accordingly, as shown in FIG. 8, the second sensing resistance RS2 to which the compensation value is added may increase as the temperature T of the printed circuit board increases, and the first sensing resistance RS1 may be constant regardless of the compensation value.

The sensing resistance determiner 612 may determine the compensation value corresponding to the temperature T of the printed circuit board through the temperature-compensation lookup table TC LUT, and may add the compensation value to the first sensing resistance RS1 to determine the second sensing resistance RS2.

The analog-digital converter 613 may determine the sensing current based on the driving sensing voltage DVS and the second sensing resistance RS2. The analog-digital converter 613 may generate the third current code CODE3 by analog-digital conversion of the sensing current. The analog-digital converter 613 may apply the third current code CODE3 to the driving controller 200. The analog-digital converter 613 may determine the sensing current by using Ohm's law (V=IR). For example, the sensing current may be determined by dividing the driving sensing voltage DVS by the second sensing resistance RS2.

Accordingly, the display device according to the present embodiments may improve the accuracy of sensing of the power current ELC by compensating for an increase of resistance according to the temperature T of the printed circuit board. That is, the display device according to the present embodiments may compensate for the resistance dispersion generated by the printed circuit board in the test period, and may compensate for increase of resistance according to the temperature T of the printed circuit board in the driving period.

Figure 9:
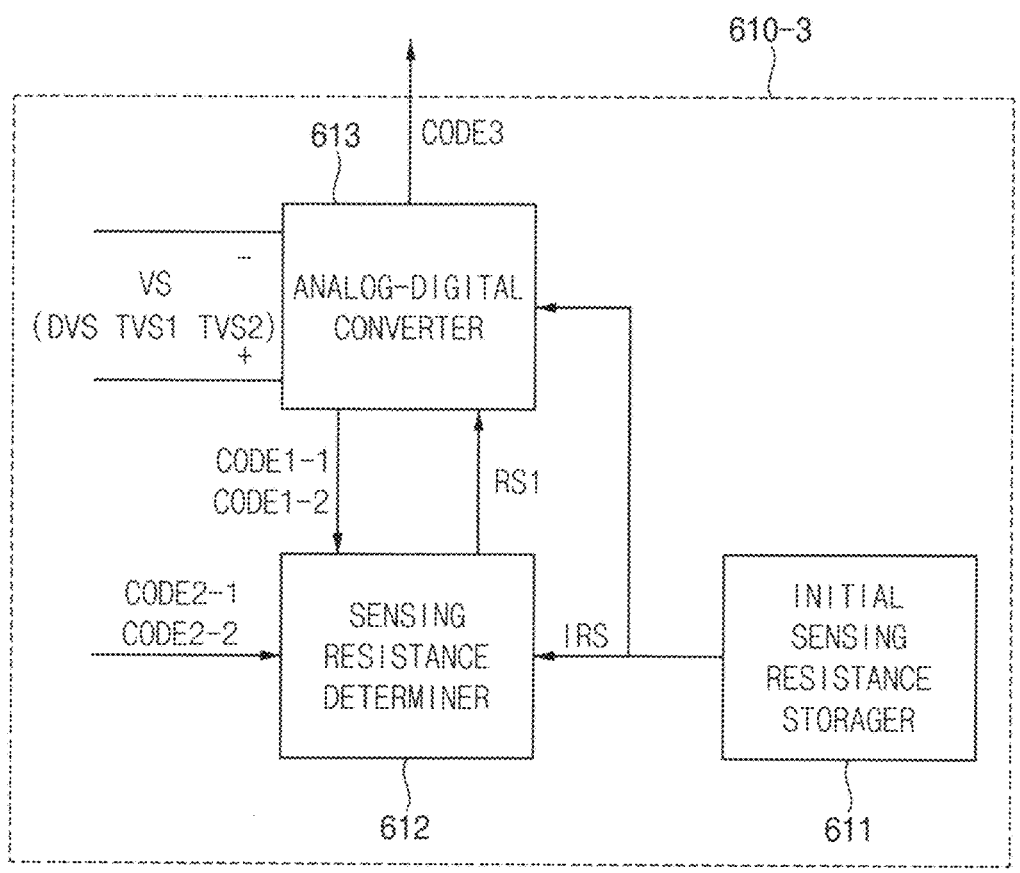
FIG. 9 is a diagram illustrating an example of a sensing current determiner of a display device according to embodiments of the present invention.
Figure 10:
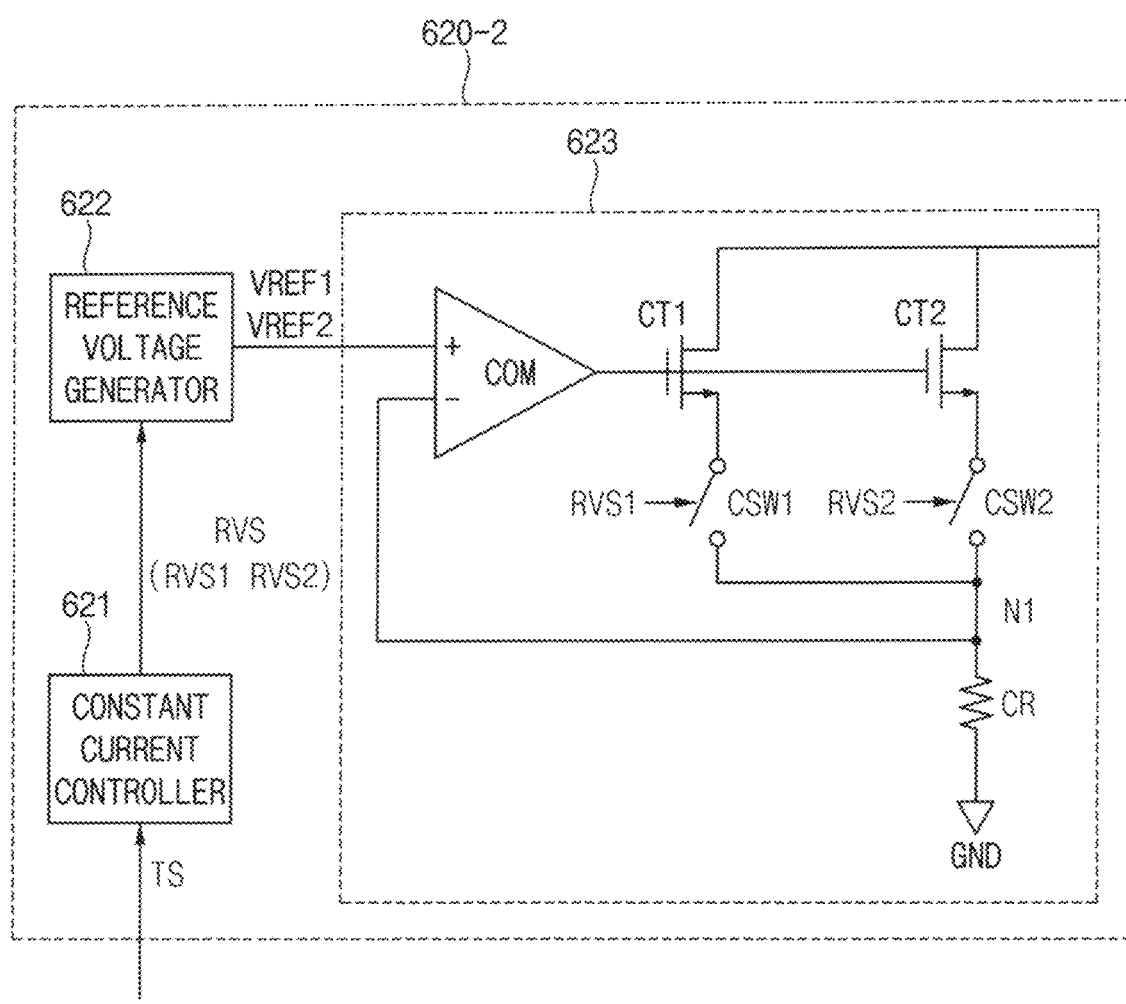
FIG. 10 is a diagram illustrating an example of a constant current generator of the display device of FIG. 9.
Figure 11:
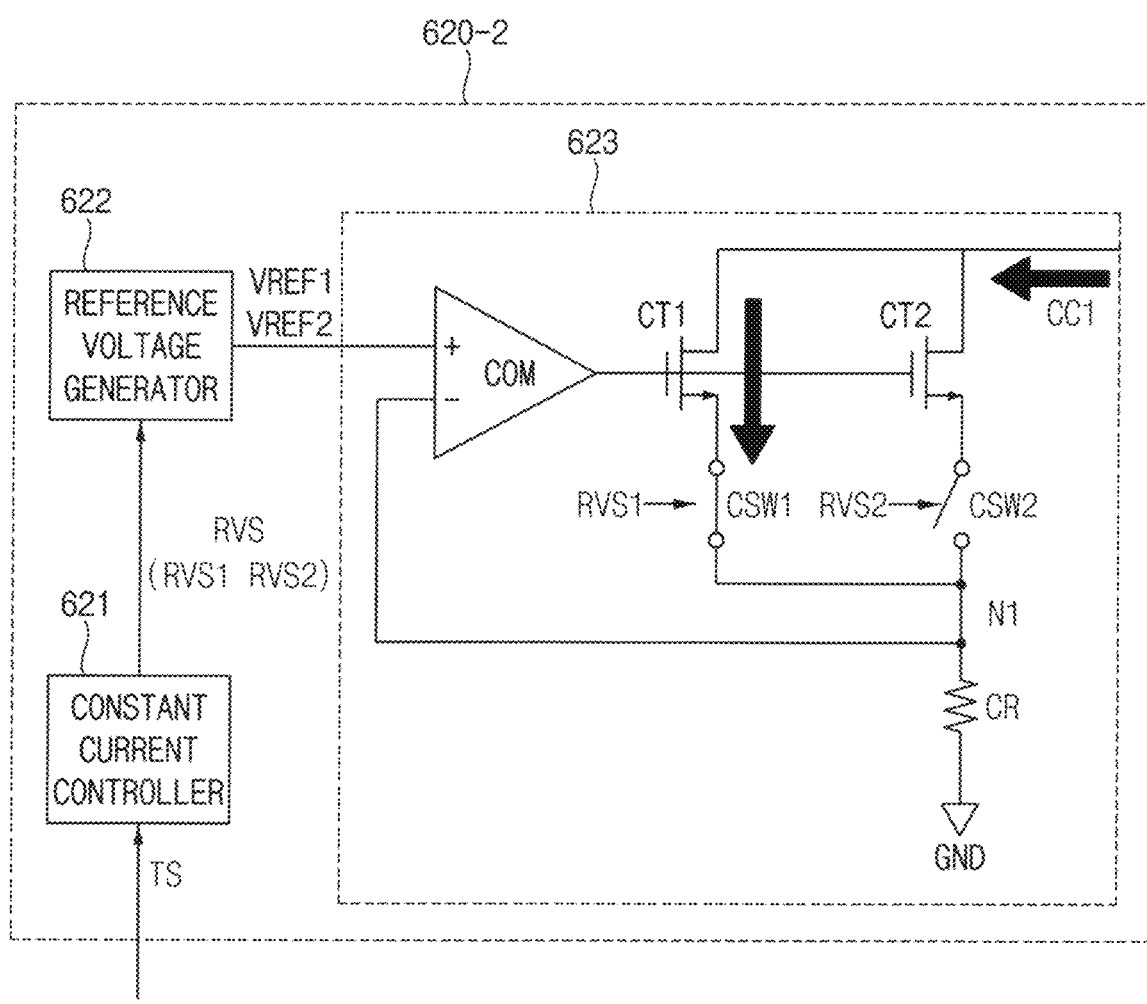
FIG. 11 is a diagram illustrating an example in which the display device of FIG. 9 generates a first constant current.
Figure 12:
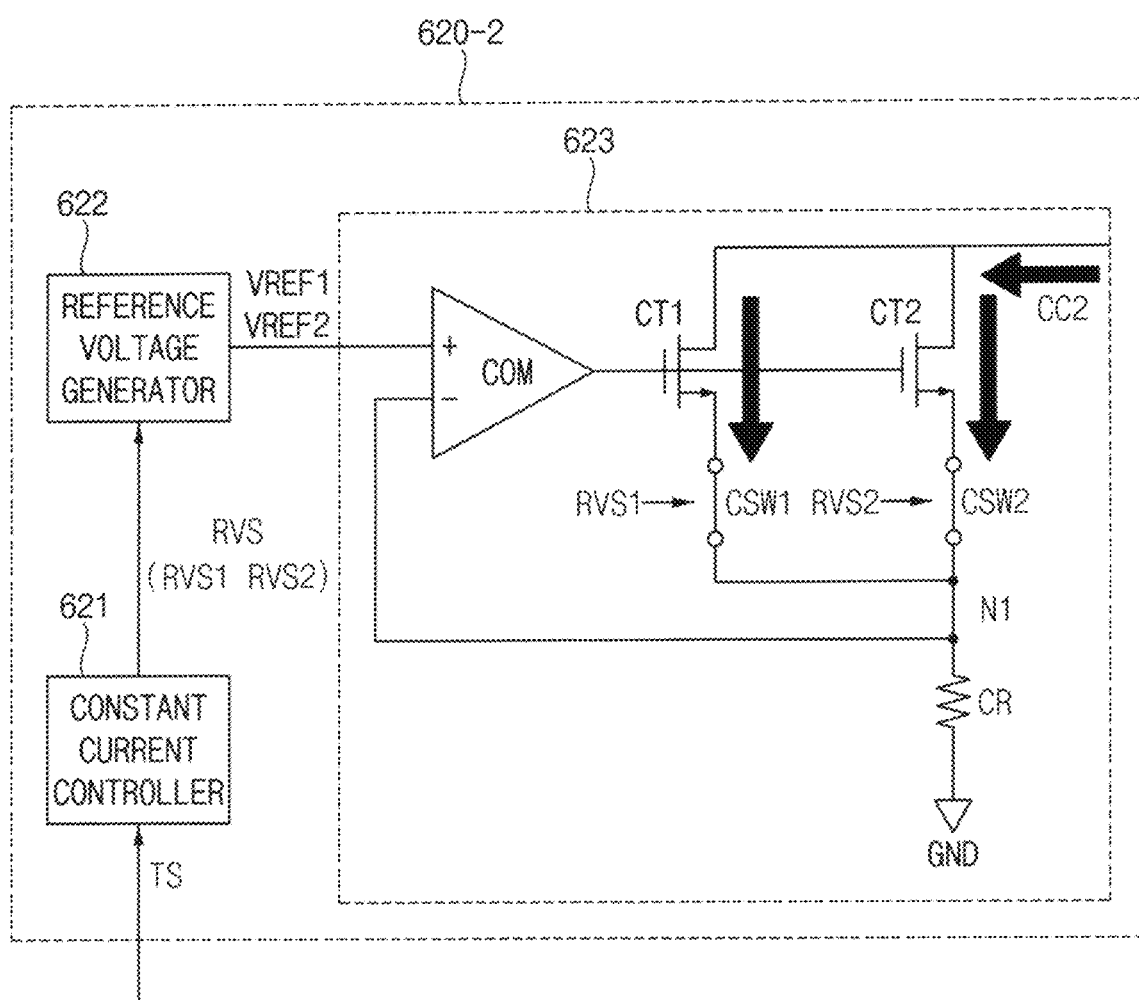
FIG. 12 is a diagram illustrating an example in which the display device of FIG. 9 generates a second constant current.
Figure 13:
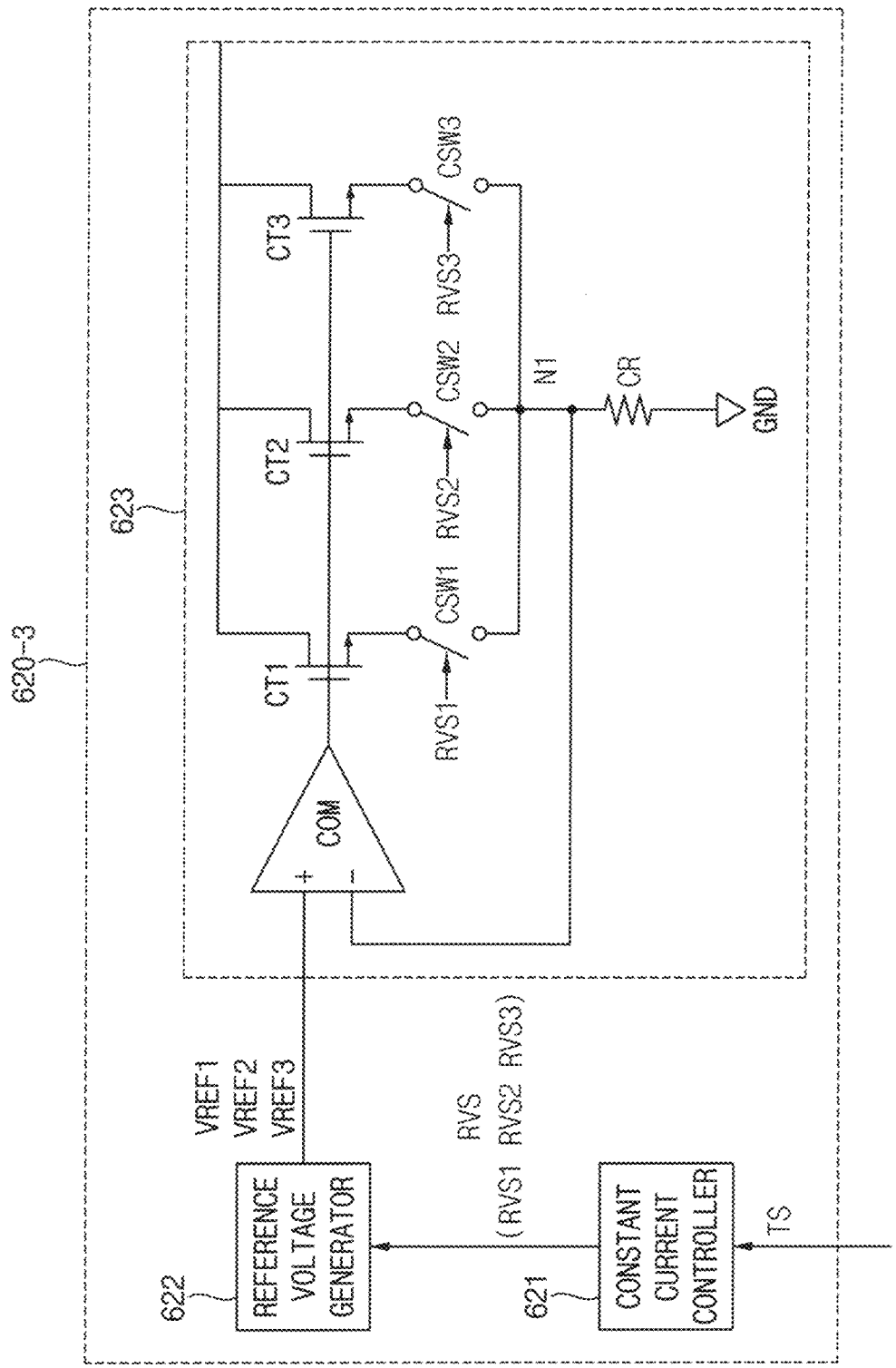
FIG. 13 is a diagram illustrating an example of a constant current generator of the display device of FIG. 9.

FIG. 9 is a diagram illustrating an example of a sensing current determiner 610-3 of a display device according to embodiments of the present invention. FIG. 10 is a diagram illustrating an example of a constant current generator 620-2 of the display device of FIG. 9, FIG. 11 is a diagram illustrating an example in which the display device of FIG. 9 generates a first constant current CC1, and FIG. 12 is a diagram illustrating an example in which the display device of FIG. 9 generates a second constant current CC2. FIG. 13 is a diagram illustrating another example of a constant current generator 620-3 of the display device of FIG. 9. FIGS. 9 to 12 illustrate that the constant current generator 620-2 generates two types of constant currents CC1 and CC2 for convenience of explanation, but the present invention is not limited thereto. For example, as shown in FIG. 13, the constant current generator 620-3 may generate three types of constant currents. Also, the constant current generator may generate four or more types of constant currents.

The display device according to the present embodiment is substantially the same as the display device 1000 of FIG. 1 except for generating a plurality of constant currents to determine a plurality of sensing resistances, and determining the first sensing resistance RS1 based on a plurality of candidate sensing resistances. Thus, the same reference numerals are used to refer to the same or similar element, and any repetitive explanation will be omitted.

Referring to FIGS. 2, 9 to 12, the current sensor 600-1 including the sensing resistor RSE disposed between the display panel 100 and the power voltage generator 500, the sensing current determiner 610-3 for determining the sensing current, and the constant current generator 620-2 for generating constant currents CC1 and CC2 to the sensing resistor RSE in the test period.

The constant current generator 620-2 may include the constant current controller 621 for applying reference voltage control signals RVS to the reference voltage generator 622 in the test period, the reference voltage generator 622 for generating a first reference voltage VREF1 and a second reference voltage VREF2 in response to the reference voltage control signals RVS, and the constant current generation circuit 623 for receiving the first reference voltage VREF1 to generate the first constant current CC1 and receiving the second reference voltage VREF2 to generate the second constant current CC2.

In an embodiment, for example, the constant current generation circuit 623 may include a comparator COM including a first input electrode for receiving the reference voltages VREF1 and VREF2, a second input electrode connected to a first node N1, and an output electrode connected to control electrodes of a constant current transistors CT1 and CT2, a first constant current transistor CT1 including a control electrode connected to the output electrode of the comparator COM, a first electrode connected to a first electrode of the sensing resistor RSE, and a second electrode connected to a first electrode of a first constant current switching element CSW1, the first constant current switching element CSW1 including the first electrode connected to the second electrode of the first constant current transistor CT1 and a second electrode connected to the first node N1, a second constant current transistor CT2 including a control electrode connected to the output electrode of the comparator COM, a first electrode connected to a first electrode of the sensing resistor RSE, and a second electrode connected to a first electrode of a second constant current switching element CSW2, the second constant current switching element CSW2 including the first electrode connected to the second electrode of the second constant current transistor CT2 and a second electrode connected to the first node N1, and a constant current resistor CR including a first electrode connected to the first node N1 and a second electrode grounded. The first constant current switching element CSW1 may be switched on in response to the first reference voltage control signal RVS1, and the second constant current switching element CSW2 may be switched on in response to the second reference voltage control signal RVS2.

In an embodiment, for example, in the test period, the constant current switching element CSW may be switched on in response to the reference voltage control signal RVS, a voltage of the first node N1 may be equal to the reference voltage VREF, and the constant current CC may be generated by the constant current resistor CR and the voltage of the first node N1 (i.e., the reference voltage VREF).

In an embodiment, for example, as shown in FIG. 11, in the test period, the reference voltage generator 622 may generate the first reference voltage VREF1 in response to the first reference voltage control signal RVS1, the first constant current switching element CSW1 may be switched on in response to the first reference voltage control signal RVS1, the voltage of the first node N1 may be equal to the first reference voltage VREF1, and the first constant current CC1 may be generated by the constant current resistor CR and the voltage of the first node N1 (i.e., the first reference voltage VREF1).

In an embodiment, for example, as shown in FIG. 12, in the test period, the reference voltage generator 622 may generate the second reference voltage VREF2 in response to the second reference voltage control signal RVS2, the first constant current switching element CSW1 may be switched on in response to the first reference voltage control signal RVS1, the second constant current switching element CSW2 may be switched on in response to the second reference voltage control signal RVS2, the voltage of the first node N1 may be equal to the second reference voltage VREF2, and the second constant current CC2 may be generated by the constant current resistor CR and the voltage of the first node N1 (i.e., the second reference voltage VREF2).

After the first reference voltage control signal RVS1 is activated in the test period, the second reference voltage control signal RVS2 may be activated. Accordingly, after the first constant current CC1 is generated to determine the first candidate sensing resistance, the second constant current CC2 may be generated to determine the second candidate sensing resistance.

The sensing current determiner 610-3 may determine test sensing currents based on the test sensing voltage TVS1 and TVS2 applied to the opposite electrodes of the sensing resistor RSE according to the constant currents CC1 and CC2 in the test period and the initial sensing resistance IRS, and may determine the candidate sensing resistances based on the test sensing currents, the initial sensing resistance IRS, and the constant currents CC1 and CC2.

In an embodiment, for example, the constant current generator 620-2 may generate a first constant current CC1 and a second constant current CC2 different from the first constant current CC1. The sensing current determiner 610-1 may determine a first test sensing current by dividing a first test sensing voltage TVS1 applied to the opposite electrodes of the sensing resistor RSE according to the first constant current CC1 by the initial sensing resistance IRS, may determine a second test sensing current by dividing a second test sensing voltage TVS2 applied to the opposite electrodes of the sensing resistor RSE according to the second constant current CC2 by the initial sensing resistance IRS, may determine a first candidate sensing resistance by dividing the first test sensing voltage TVS1 by the first constant current CC1, and may determine a second candidate sensing resistance by dividing the second test sensing voltage TVS2 by the second constant current CC2.

In an embodiment, for example, in the test period, the constant current generator 620-2 may generate the first constant current CC1 to the sensing resistor RSE. The analog-digital converter 613 may determine the first test sensing current by dividing the first test sensing voltage TVS1 by the initial sensing resistor IRS, and may convert the first test sensing current to analog-to-digital to generate a 1-1 current code CODE1-1. The sensing resistance determiner 612 may calculate the first test sensing voltage TVS1 based on the 1-1 current code CODE1-1 and the initial sensing resistance IRS. The sensing resistance determiner 612 may calculate the first constant current CC1 from a 2-1 current code CODE2-1 generated by analog-digital conversion of the first constant current CC1. The sensing resistance determiner 612 may determine the first candidate sensing resistance by dividing the first test sensing voltage TVS1 by the first constant current CC1.

In an embodiment, for example, in the test period, the constant current generator 620-2 may generate the second constant current CC2 to the sensing resistor RSE. The analog-digital converter 613 may determine the second test sensing current by dividing the second test sensing voltage TVS2 by the initial sensing resistor IRS, and may convert the second test sensing current to analog-to-digital to generate a 1-2 current code CODE1-2. The sensing resistance determiner 612 may calculate the second test sensing voltage TVS2 based on the 1-2 current code CODE1-2 and the initial sensing resistance IRS. The sensing resistance determiner 612 may calculate the second constant current CC2 from a 2-2 current code CODE2-2 generated by analog-digital conversion of the second constant current CC2. The sensing resistance determiner 612 may determine the second candidate sensing resistance by dividing the second test sensing voltage TVS2 by the second constant current CC2.

The analog-digital converter 613 may determine the sensing current based on the driving sensing voltage DVS and the first sensing resistance RS1. The analog-digital converter 613 may generate the third current code CODE3 by analog-digital conversion of the sensing current. The analog-digital converter 613 may apply the third current code CODE3 to the driving controller 200. The analog-digital converter 613 may determine the sensing current by using Ohm's law (V=IR). For example, the sensing current may be determined by dividing the driving sensing voltage DVS by the first sensing resistance RS1.

The sensing current determiner 610-3 may determine the first sensing resistance RS1 based on the candidate sensing resistances, and may determine the sensing current based on the driving sensing voltage DVS applied to the opposite electrodes of the sensing resistor RSE in the driving period and the first sensing resistance RS1. In an embodiment, the sensing current determiner 610-3 may determine a maximum value among the candidate sensing resistances (e.g., the first candidate sensing resistance and the second candidate sensing resistance) as the first sensing resistance RS1. In another embodiment, the sensing current determiner 610-3 may determine a minimum value among the candidate sensing resistances as the first sensing resistance RS1. In still another embodiment, the sensing current determiner 610-3 may determine an average value of the candidate sensing resistances as the first sensing resistance RS1.

Accordingly, the display device according to the embodiments may improve the accuracy of the sensing of the power current ELC compared to the case that the first sensing resistor RS1 is determined using one constant current by determining the first sensing resistance RS1 using a plurality of the constant currents.

Referring to FIGS. 9 and 13, the constant current generator 620-3 may generate the first constant current CC1, the second constant current CC2, and a third constant current CC3, which are different from each other, and may determine the first sensing resistance RS1 based on the first candidate sensing resistor determined based on the first constant current CC1, the second candidate sensing resistor determined based on the second constant current CC2, and the third candidate sensing resistor determined based on the third constant current CC3.

The constant current generator 620-3 may include the constant current controller 621 for applying reference voltage control signals RVS to the reference voltage generator 622 in the test period, the reference voltage generator 622 for generating the first reference voltage VREF1, the second reference voltage VREF2, and a third reference voltage VREF3 in response to the reference voltage control signals RVS, and the constant current generation circuit 623 for receiving the first reference voltage VREF1 to generate the first constant current CC1, receiving the second reference voltage VREF2 to generate the second constant current CC2, and receiving the third reference voltage VREF3 to generate the third constant current CC3.

In an embodiment, for example, the constant current generation circuit 623 may include a comparator COM including a first input electrode for receiving the reference voltages VREF1, VREF2, and VREF3, a second input electrode connected to a first node N1, and an output electrode connected to control electrodes of a constant current transistors CT1, CT2, and CT3, a first constant current transistor CT1 including a control electrode connected to the output electrode of the comparator COM, a first electrode connected to a first electrode of the sensing resistor RSE, and a second electrode connected to a first electrode of a first constant current switching element CSW1, the first constant current switching element CSW1 including the first electrode connected to the second electrode of the first constant current transistor CT1 and a second electrode connected to the first node N1, a second constant current transistor CT2 including a control electrode connected to the output electrode of the comparator COM, a first electrode connected to a first electrode of the sensing resistor RSE, and a second electrode connected to a first electrode of a second constant current switching element CSW2, the second constant current switching element CSW2 including the first electrode connected to the second electrode of the second constant current transistor CT2 and a second electrode connected to the first node N1, a third constant current transistor CT3 including a control electrode connected to the output electrode of the comparator COM, a first electrode connected to a first electrode of the sensing resistor RSE, and a second electrode connected to a first electrode of a third constant current switching element CSW3, the third constant current switching element CSW3 including the first electrode connected to the second electrode of the third constant current transistor CT3 and a second electrode connected to the first node N1, and a constant current resistor CR including a first electrode connected to the first node N1 and a second electrode grounded. The first constant current switching element CSW1 may be switched on in response to the first reference voltage control signal RVS1, the second constant current switching element CSW2 may be switched on in response to the second reference voltage control signal RVS2, and the third constant current switching element CSW3 may be switched on in response to the third reference voltage control signal RVS3.

Figure 14:
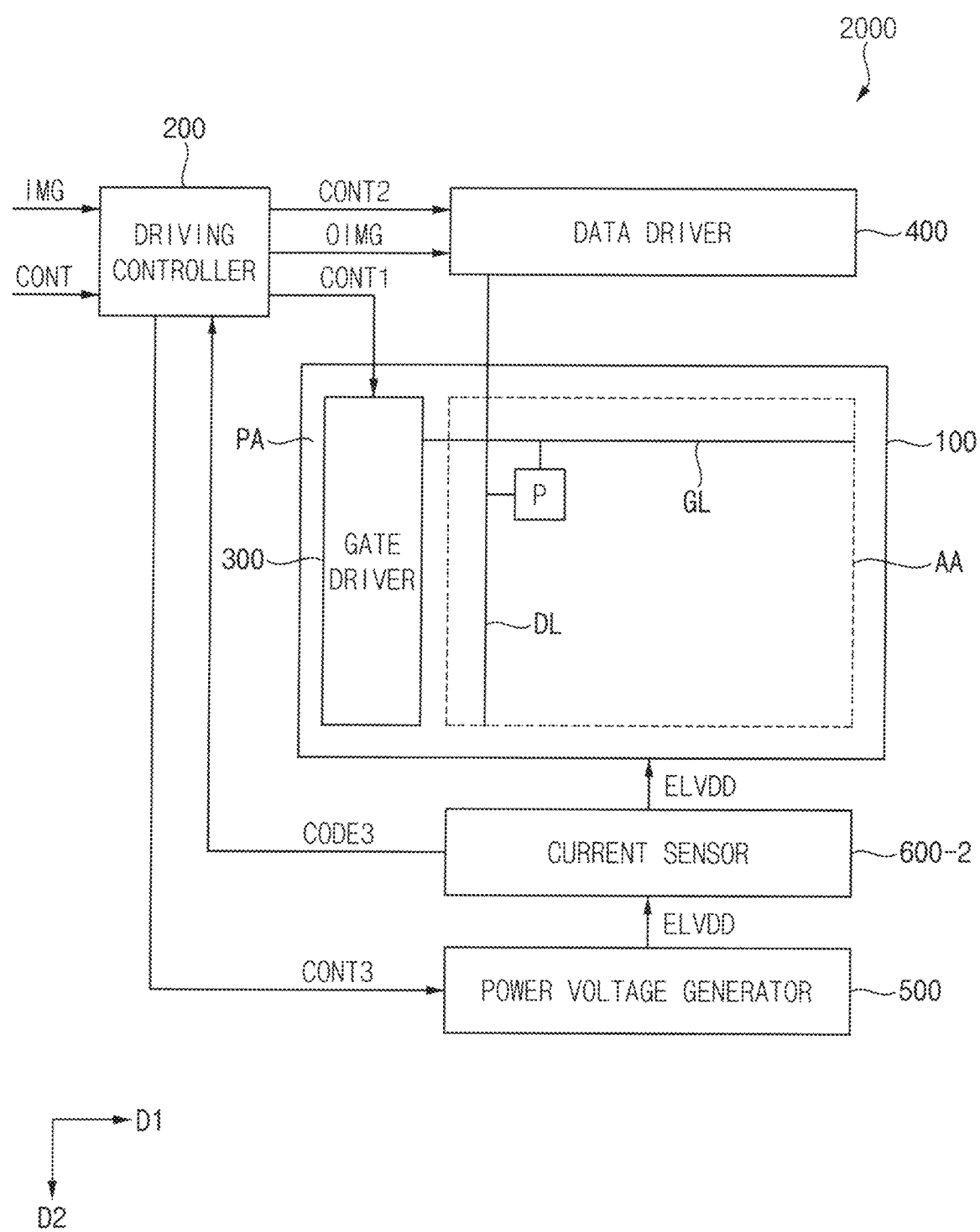
FIG. 14 is a block diagram illustrating a display device according to embodiments of the present invention.

FIG. 14 is a block diagram illustrating a display device 2000 according to embodiments of the present invention.

The display device according to the present embodiment is substantially the same as the display device 1000 of FIG. 1 except for the current sensor 600-2. Thus, the same reference numerals are used to refer to the same or similar element, and any repetitive explanation will be omitted.

The driving controller 200 may generate a first control signal CONT1, a second control signal CONT2, a third control signal CONT3, and output image data OIMG based on the input image data IMG, a third current code CODE3, and the input control signal CONT.

The driving controller 200 may generate the first control signal CONT1 for controlling operation of the gate driver 300 based on the input control signal CONT and output the first control signal CONT1 to the gate driver 300. The first control signal CONT1 may include a vertical start signal and a gate clock signal.

The driving controller 200 may generate the second control signal CONT2 for controlling operation of the data driver 400 based on the input control signal CONT and output the second control signal CONT2 to the data driver 400. The second control signal CONT2 may include a horizontal start signal and a load signal.

The driving controller 200 may generate the third control signal CONT3 for controlling operation of the power voltage generator 500 based on the input control signal CONT and output the third control signal CONT3 to the power voltage generator 500.

The driving controller 200 may receive the input image data IMG and the input control signal CONT, and generate the output image data OIMG. In an embodiment, the driving controller 200 may receive the input image data IMG, the third current code CODE3, and the input control signal CONT, and generate the output image data OIMG. The driving controller 200 may output the output image data OIMG to the data driver 400.

The current sensor 600-2 may sense a current flowing therethrough as the power voltage generator 500 applies the power voltage ELVDD to the display panel 100. A detailed description thereof will be given later.

Figure 15:
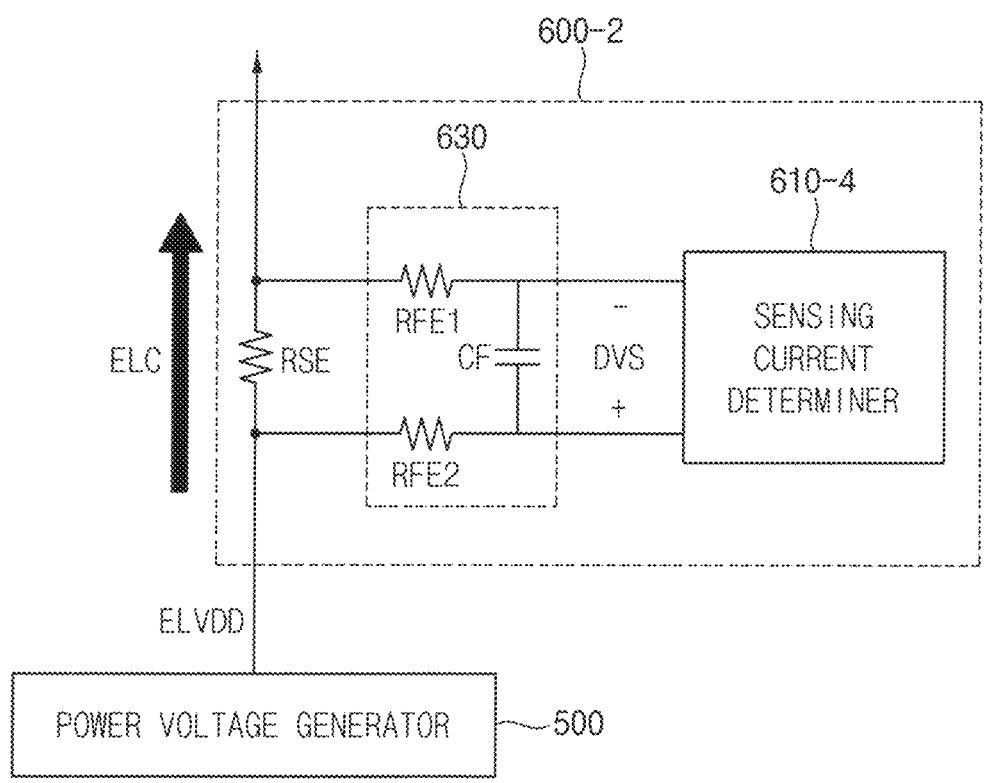
FIG. 15 is a diagram illustrating an example of a current sensor of the display device of FIG. 14.
Figure 16:
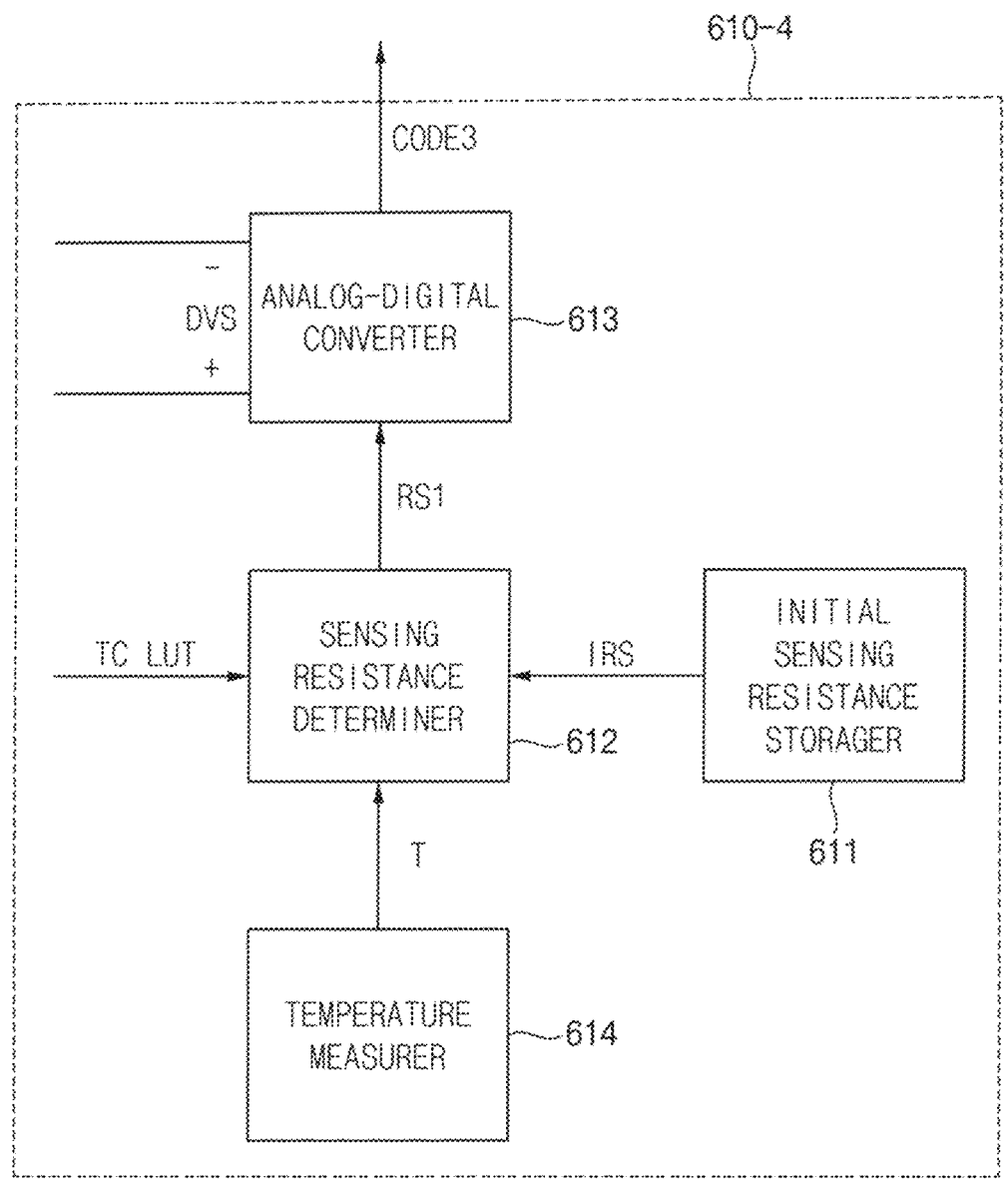
FIG. 16 is a diagram illustrating an example of a sensing current determiner of the display device of FIG. 14.
Figure 17:
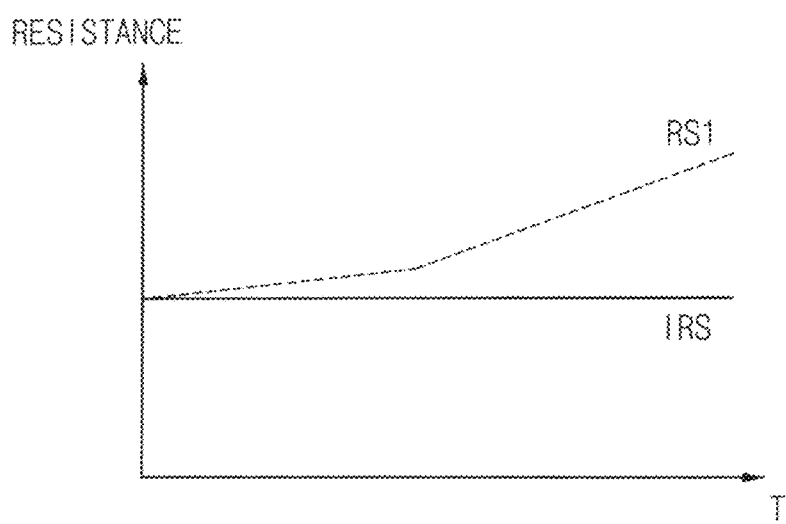
FIG. 17 is a graph illustrating an example of an initial sensing resistance and a first sensing resistance of the display device of FIG. 14.

FIG. 15 is a diagram illustrating an example of a current sensor 600-2 of the display device 2000 of FIG. 14, FIG. 16 is a diagram illustrating an example of a sensing current determiner 610-4 of the display device 2000 of FIG. 14, and FIG. 17 is a graph illustrating an example of an initial sensing resistance IRS and a first sensing resistance RS1 of the display device 2000 of FIG. 14.

Referring to FIGS. 14 to 17, the current sensor 600-2 may include a sensing resistor RSE disposed between the display panel 100 and the power voltage generator 500, and the sensing current determiner 610-4 for determining the sensing current. In an embodiment, the current sensor 600-2 may be disposed on the printed circuit board.

In an embodiment, the current sensor 600-2 may further include a filter 630 blocking a current flowing to the sensing current determiner 610-4. Accordingly, the power current ELC and the constant current CC may not flow to the sensing current determiner 610-4.

In an embodiment, for example, the filter 630 may include a first filter resistor RFE1 including a first electrode connected to a first electrode of the sensing resistor RSE and a second electrode connected to the sensing current determiner 610-4, a second filter resistor RFE2 including a first electrode connected to the second electrode of the sensing resistor RSE and a second electrode connected to the sensing current determiner 610-4, and the filter capacitor CF including a first electrode connected to the second electrode of the first filter resistor RFE1 and a second electrode connected to the second electrode of the second filter resistor RFE2. A resistance of the first filter resistor RFE1 and a resistance of the second filter resistor RFE2 may be the same.

The sensing current determiner 610-4 may sense the temperature T of the printed circuit board, determine the first sensing resistance RS1 based on the temperature T of the printed circuit board and the initial sensing resistance IRS, and determine the sensing current based on the driving sensing voltage DVS applied to the opposite electrodes of the sensing resistor RSE and the first sensing resistance RS1.

In an embodiment, the sensing current determiner 610-4 may include an initial sensing resistance storager 611, a sensing resistance determiner 612, an analog-digital converter 613, an analog-digital converter 613, and a temperature measurer 614. The temperature measurer 614 may sense the temperature T of the printed circuit board. The initial sensing resistance storager 611 may store the initial sensing resistance IRS. The sensing resistance determiner 612 may include the temperature-compensation lookup table TC LUT in which the compensation value according to the temperature T of the printed circuit board is stored, may determine the compensation value based on the temperature T of the printed circuit board and the temperature-compensation lookup table TC LUT, and may determine the first sensing resistance RS1 by adding the compensation value to the initial sensing resistance IRS. The analog-digital converter 613 may determine the sensing current in the driving period, and may generate the third current code CODE3 by analog-digital conversion of the sensing current.

The sensing resistance determiner 612 may determine the compensation value based on the temperature T of the printed circuit board and the temperature-compensation lookup table TC LUT, and may determine the first sensing resistance RS1 by adding the compensation value to the initial sensing resistance IRS. The compensation value may increase as the temperature T of the printed circuit board increases.

A resistance including a parasitic resistance of the sensing resistor RSE may increase as temperature increases. Since the sensing resistor RSE is disposed on the printed circuit board, the resistance of the sensing resistor RSE may increase as the temperature T of the printed circuit board increases. The temperature-compensation lookup table TC LUT may store a degree of resistance increase according to temperature as the compensation value according to the temperature T of the printed circuit board. Accordingly, as shown in FIG. 17, the second sensing resistance RS2 to which the compensation value is added may increase as the temperature T of the printed circuit board increases, and the first sensing resistance RS1 may be constant regardless of the compensation value.

The sensing resistance determiner 612 may determine the compensation value corresponding to the temperature T of the printed circuit board through the temperature-compensation lookup table TC LUT, and may add the compensation value to the initial sensing resistance IRS to determine the first sensing resistance RS2.

The analog-digital converter 613 may determine the sensing current based on the driving sensing voltage DVS and the first sensing resistance RS1. The analog-digital converter 613 may generate the third current code CODE3 by analog-digital conversion of the sensing current. The analog-digital converter 613 may apply the third current code CODE3 to the driving controller 200. The analog-digital converter 613 may determine the sensing current by using Ohm's law (V=IR). For example, the sensing current may be determined by dividing the driving sensing voltage DVS by the first sensing resistance RS1.

Accordingly, the display device may improve the accuracy of the sensing of the power current ELC by compensating for an increase of resistance according to the temperature T of the printed circuit board.

The inventions may be applied to any electronic device including the display device. For example, the inventions may be applied to a television ("TV"), a digital TV, a 3D TV, a mobile phone, a smart phone, a tablet computer, a virtual reality ("VR") device, a wearable electronic device, a personal computer ("PC"), a home appliance, a laptop computer, a personal digital assistant ("PDA"), a portable multimedia player ("PMP"), a digital camera, a music player, a portable game console, a navigation device, etc.

As used in connection with various embodiments of the disclosure, each of the power voltage generator 500, the sensing current determiner 610-1, the constant current generator 620-1, the sensing resistance determiner 612, the initial sensing resistance storager 611, etc. may be implemented in hardware, software, or firmware, for example, implemented in a form of an application-specific integrated circuit (ASIC).

The foregoing is illustrative of the present invention and is not to be construed as limiting thereof. Although a few exemplary embodiments of the present invention have been described, those skilled in the art will readily appreciate that many modifications are possible in the exemplary embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific exemplary embodiments disclosed, and that modifications to the disclosed exemplary embodiments, as well as other exemplary embodiments, are intended to be included within the scope of the appended claims. The present invention is defined by the following claims, with equivalents of the claims to be included therein.

What is claimed is:

1. A display device comprising:
    a display panel including pixels;
    a power voltage generator configured to apply a power current to the display panel in a driving period; and
    a current sensor including a sensing resistor disposed between the display panel and the power voltage generator, a sensing current determiner configured to determine a sensing current, and a constant current generator configured to generate a constant current to provide to the sensing resistor in a test period,
    wherein the sensing current determiner is configured to determine a test sensing current based on a test sensing voltage applied to opposite electrodes of the sensing resistor in the test period and an initial sensing resistance, to determine a first sensing resistance based on the test sensing current, the initial sensing resistance, and the constant current, to determine the sensing current based on a driving sensing voltage applied to the opposite electrodes of the sensing resistor in the driving period and the first sensing resistance, and to determine the sensing current as the power current,
    wherein the initial sensing resistance is a predetermined resistance of the sensing resistor,
    wherein the current sensor further comprises a test switching element disposed between the display panel and the sensing resistor, directly connected to the sensing resistor, and configured to be switched off in the test period and to be switched on in the driving period such that in the test period, the power voltage generator does not apply the power current to the display panel.

2. The display device of claim 1, wherein the test sensing current is determined by dividing the test sensing voltage by the initial sensing resistance,
    wherein the first sensing resistance is determined by dividing the test sensing voltage by the constant current, and
    wherein the sensing current is determined by dividing the driving sensing voltage by the first sensing resistance.

3. The display device of claim 1, wherein the sensing current determiner comprises:
    a sensing resistance determiner configured to determine the first sensing resistance based on a first current code corresponding to the test sensing current, a second current code corresponding to the constant current, and the initial sensing resistance;
    an initial sensing resistance storage configured to store the initial sensing resistance; and
    an analog-digital converter configured to determine the test sensing current in the test period, to generate the first current code by analog-digital conversion of the test sensing current, to determine the sensing current in the driving period, and to generate a third current code by analog-digital conversion of the sensing current.

4. The display device of claim 1, wherein the current sensor further comprises:
    a filter configured to block a current flowing to the sensing current determiner.

5. The display device of claim 1, wherein the constant current generator comprises:
    a constant current controller configured to apply a reference voltage control signal to a reference voltage generator in the test period;
    the reference voltage generator configured to generate a reference voltage in response to the reference voltage control signal; and
    a constant current generation circuit configured to receive the reference voltage to generate the constant current.

6. The display device of claim 5, wherein the constant current generation circuit comprises:
    a comparator including a first input electrode configured to receive the reference voltage, a second input electrode connected to a first node, and an output electrode connected to a control electrode of a constant current transistor;
    the constant current transistor including the control electrode connected to the output electrode of the comparator, a first electrode connected to a first electrode of the sensing resistor, and a second electrode connected to a first electrode of a constant current switching element;
    the constant current switching element including the first electrode connected to the second electrode of the constant current transistor and a second electrode connected to the first node; and
    a constant current resistor including a first electrode connected to the first node and a second electrode grounded.

7. The display device of claim 1, wherein the current sensor is disposed on a printed circuit board, and
    wherein the sensing current determiner is configured to sense a temperature of the printed circuit board, to determine a second sensing resistance based on the temperature of the printed circuit board and the first sensing resistance, and to determine the sensing current based on the driving sensing voltage and the second sensing resistance.

8. The display device of claim 7, wherein the sensing current determiner comprises:
- a temperature measurer configured to sense the temperature of the printed circuit board;
- a sensing resistance determiner, including a temperature-compensation lookup table in which a compensation value according to the temperature of the printed circuit board is stored, and configured to determine the first sensing resistance based on a first current code corresponding to the test sensing current, a second current code corresponding to the constant current, and the initial sensing resistance, configured to determine the compensation value based on the temperature of the printed circuit board and the temperature-compensation lookup table, and configured to determine the second sensing resistance by adding the compensation value to the first sensing resistance;
- an initial sensing resistance storage configured to store the initial sensing resistance; and
- an analog-digital converter configured to determine the test sensing current in the test period, to generate the first current code by analog-digital conversion of the test sensing current, to determine the sensing current in the driving period, and to generate a third current code by analog-digital conversion of the sensing current.

9. The display device of claim 8, wherein the compensation value increases as the temperature of the printed circuit board increases.

10. A display device comprising:
- a display panel including pixels;
- a power voltage generator configured to apply a power current to the display panel in a driving period; and
- a current sensor including a sensing resistor disposed between the display panel and the power voltage generator, a sensing current determiner configured to determine a sensing current, and a constant current generator configured to generate constant currents to provide to the sensing resistor in a test period,
- wherein the sensing current determiner is configured to determine test sensing currents based on a test sensing voltage applied to opposite electrodes of the sensing resistor according to the constant currents in the test period and an initial sensing resistance, to determine candidate sensing resistances based on the test sensing currents, the initial sensing resistance, and the constant currents, to determine a first sensing resistance based on the candidate sensing resistances, to determine the sensing current based on a driving sensing voltage applied to the opposite electrodes of the sensing resistor in the driving period and the first sensing resistance, and to determine the sensing current as the power current,
- wherein the initial sensing resistance is a predetermined resistance of the sensing resistor,
- wherein the current sensor further comprises a test switching element disposed between the display panel and the sensing resistor, directly connected to the sensing resistor, and configured to be switched off in the test period and to be switched on in the driving period such that in the test period, the power voltage generator does not apply the power current to the display panel.

11. The display device of claim 10, wherein the constant current generator is configured to generate a first constant current and a second constant current different from the first constant current,
- wherein the sensing current determiner is configured to determine a first test sensing current by dividing a first test sensing voltage applied to the opposite electrodes of the sensing resistor according to the first constant current by the initial sensing resistance,
- wherein the sensing current determiner is configured to determine a second test sensing current by dividing a second test sensing voltage applied to the opposite electrodes of the sensing resistor according to the second constant current by the initial sensing resistance,
- wherein the sensing current determiner is configured to determine a first candidate sensing resistance by dividing the first test sensing voltage by the first constant current,
- wherein the sensing current determiner is configured to determine a second candidate sensing resistance by dividing the second test sensing voltage by the second constant current, and
- wherein the sensing current determiner is configured to determine the sensing current based on the first candidate sensing resistance and the second candidate sensing resistance.

12. The display device of claim 11, wherein the constant current generator comprises:
- a constant current controller configured to apply reference voltage control signals to a reference voltage generator in the test period;
- a reference voltage generator configured to generate a first reference voltage and a second reference voltage in response to the reference voltage control signals; and
- a constant current generation circuit configured to receive the first reference voltage to generate the first constant current, and to receive the second reference voltage to generate the second constant current.

13. The display device of claim 10, wherein the sensing current determiner is configured to determine a maximum value among the candidate sensing resistances as the first sensing resistance.

14. The display device of claim 10, wherein the sensing current determiner is configured to determine a minimum value among the candidate sensing resistances as the first sensing resistance.

15. The display device of claim 10, wherein the sensing current determiner is configured to determine an average value of the candidate sensing resistances as the first sensing resistance.

16. An electronic device comprising:
- a display panel including pixels;
- a power voltage generator configured to apply a power current to the display panel; and
- a current sensor disposed on a printed circuit board, and including a sensing resistor disposed between the display panel and the power voltage generator, a sensing current determiner configured to determine a sensing current, and a filter connecting the sensing resistor and the sensing current determiner,
- wherein the sensing current determiner is configured to sense a temperature of the printed circuit board, to determine a first sensing resistance based on the temperature of the printed circuit board and an initial sensing resistance, to determine the sensing current based on a driving sensing voltage applied to opposite electrodes of the sensing resistor and the first sensing resistance, and to determine the sensing current as the power current,
- wherein the initial sensing resistance is a predetermined resistance of the sensing resistor, wherein the filter includes a first filter resistor including a first electrode directly connected to one of the opposite electrodes of the sensing resistor and a second electrode directly connected to the sensing current determiner, a second filter resistor including a first electrode directly connected to another of the opposite electrodes of the sensing resistor and a second electrode directly connected to the sensing current determiner, and a filter capacitor including a first electrode directly connected to the second electrode of the first filter resistor and a second electrode directly connected to the second electrode of the second filter resistor.

17. The electronic device of claim 16, wherein the sensing current is determined by dividing the driving sensing voltage by the first sensing resistance.

18. The electronic device of claim 16, wherein the sensing current determiner comprises:

a temperature measurer configured to sense the temperature of the printed circuit board;

a sensing resistance determiner, including a temperature-compensation lookup table in which a compensation value according to the temperature of the printed circuit board is stored, and configured to determine the compensation value based on the temperature of the printed circuit board and the temperature-compensation lookup table, and configured to determine the first sensing resistance by adding the compensation value to the initial sensing resistance;

an initial sensing resistance storage configured to store the initial sensing resistance; and an analog-digital converter configured to determine the sensing current, and to convert the sensing current to analog-to-digital.

19. The electronic device of claim 18, wherein the compensation value increases as the temperature of the printed circuit board increases.

\* \* \* \* \*